US010039417B2

(12) United States Patent
Chen et al.

(10) Patent No.: US 10,039,417 B2
(45) Date of Patent: Aug. 7, 2018

(54) OVEN APPARATUS

(71) Applicant: Kuang-Chung Chen, New Taipei (TW)

(72) Inventors: Kuang-Chung Chen, New Taipei (TW); Tepao Chou, Taipei (TW)

(73) Assignee: Kuang-Chung Chen, New Taipei (TW)

( * ) Notice: Subject to any disclaimer, the term of this patent is extended or adjusted under 35 U.S.C. 154(b) by 100 days.

(21) Appl. No.: 15/217,425

(22) Filed: Jul. 22, 2016

(65) Prior Publication Data

US 2017/0020335 A1 Jan. 26, 2017

(30) Foreign Application Priority Data

Jul. 22, 2015 (TW) ............................ 104211781 U
Nov. 13, 2015 (CN) .................... 2015 2 0905665 U

(51) Int. Cl.

*A47J 37/04* (2006.01)
*A47J 37/07* (2006.01)
*F24B 9/00* (2006.01)
*F24B 13/02* (2006.01)

(52) U.S. Cl.

CPC ....... *A47J 37/0731* (2013.01); *A47J 37/0745* (2013.01); *A47J 37/0786* (2013.01); *F24B 9/00* (2013.01); *F24B 13/02* (2013.01); *Y02A 40/928* (2018.01)

(58) Field of Classification Search

CPC .......................... A47J 37/0731; A47J 37/0745
USPC ........................... 126/19 R; 219/386; 99/345
See application file for complete search history.

(56) References Cited

U.S. PATENT DOCUMENTS

| | | | | |
|---|---|---|---|---|
| 4,282,853 A * | 8/1981 | Reynolds | A47J 37/06 126/19 R |
| 5,526,734 A * | 6/1996 | Harrison | A47J 37/0641 126/21 A |
| 5,560,285 A | 10/1996 | Moreth | |
| 6,250,210 B1 | 6/2001 | Moreth | |
| 6,405,640 B1 | 6/2002 | Moreth | |
| 8,338,756 B2 * | 12/2012 | Shei | A21B 3/00 219/402 |
| 8,624,166 B2 | 1/2014 | Moreth, III | |
| 2007/0108177 A1 * | 5/2007 | Engelhardt | A21B 1/44 219/388 |

(Continued)

FOREIGN PATENT DOCUMENTS

TW M386767 U1 8/2010

*Primary Examiner* — Avinash Savani
(74) *Attorney, Agent, or Firm* — Chun-Ming Shih

(57) ABSTRACT

An oven apparatus includes an oven portion and an oven controller. The oven portion has an upper chamber with an oven opening, a support platform having a void space in the center of the support platform for accommodating a rotary structure on which an object can be arranged, and a heating device is arranged in the upper chamber. The oven controller has a power module electrically coupled to an external power source for providing a power required for operation of oven apparatus, and a heating control module further having a first and a second heat control units electrically coupled to the heating device and the rotary structure, respectively, for controlling a temperature of the heating device and a temperature of the rotary structure, respectively. In addition, the oven apparatus further has a conduit assembly around the oven housing for recycling the emitted heat.

19 Claims, 22 Drawing Sheets

(56) References Cited

U.S. PATENT DOCUMENTS

2014/0239788 A1* 8/2014 Turner .................... F24C 15/16
312/350

* cited by examiner

OVEN APPARATUS

This application claims the benefit of Taiwan Patent Application Serial No. 104211781, filed on Jul. 22, 2015, and China Paten Application Serial No. 201520905665.7, filed on Nov. 13, 2015, the subject matter of which is incorporated herein by reference.

BACKGROUND OF INVENTION

1. Field of the Invention

The present invention is related to an oven apparatus, and more particularly, to an oven structure for providing even distribution of heat, fast cooking food and heat energy recycling.

2. Description of the Prior Art

Conventionally, the charbroiler or grill has a griddle plate or grate on which the food is arranged and is baked or grilled directly through charcoal fire. However, during the baking or grilling process for preparing the food, the charcoal fire may easily make the food be charred and the burn dirty can get deposited on the food such that not only can the health risks be increased, but also can human cancer risks be posed.

In order to solve the abovementioned problem, the improved ovens on the market provides a measure by arranging the food and charcoal fire respectively at two different sides of a heat conducting plate, e.g., upper side and bottom side, for preventing the charcoal fire from directly contacting and charring the food. Although the measure can solve the problem caused by charcoal fire, the food arranged on the flat plate directly over or close to the heat plate may not be fully cooked due to the uneven heat transfer or may be charred due to the unsuitable cooking time control.

In addition, although the conventional oven can provide high heat energy to cook or bake the pizza or bread, and the high temperature inside the oven can make the pizza or bread more delicious, the excess heat is emitted directly to the air without recycling. On the other hand, it is known that hot water is necessary item when preparing food or drink. However, the conventional way is to utilize additional facility, such as electric water heater or gas water heater, to heat cool water for generating the hot water that is required. Therefore, if the waste heat emitted from the conventional oven is not properly recycled and additional facility is utilized to heat water for food or drink, it is regarded as double waste that is against the consciousness of energy conservation and environmental protection that has arisen in the recent years.

Accordingly, there has a need to provide an oven apparatus that can solve the problem mentioned above.

SUMMARY OF THE INVENTION

The present invention provides an oven apparatus for providing even heat distribution through a first heating device arranged over the food, a second heating device under a rotary structure carrying the food, and a regular rotation of the rotary structure such that the food can be quickly, and thoroughly cooked.

The present invention provides an oven apparatus having a display for showing a predetermined temperature and currently measured temperature whereby the operator can know the temperature variation and control the timing to take out the food from the oven apparatus.

The present invention provides an oven apparatus having conduit assembly for recycling the emitted heat energy and reusing the recycled heat energy to heat the water or liquid thereby generating hot water or water steam for purpose of cooking. Accordingly, not only can the present invention provide delicious food, but also the heat energy can be recycled and reused thereby saving energy and achieving economic effect of environmental protection.

In order to achieve the above-mentioned purpose, in one embodiment, the present invention provides an oven apparatus comprising an oven portion and an oven controller. The oven portion is configured to have an oven housing having an oven opening coupled to an upper chamber of the oven housing, a support platform coupled to the upper chamber, and a heating device is arranged in the upper chamber, wherein a void space is formed in the center of the support platform for accommodating a rotary structure on which an object can be arranged. The oven controller is configured to have a power module electrically coupled to an external power source for providing a power required by the oven portion, and a heating control module electrically coupled to the power module and further comprising a first heat control unit and a second heat control unit electrically coupled to the heating device and the rotary structure, respectively, for controlling a temperature of the heating device and a temperature of the rotary structure according to predetermined temperatures corresponding to the heating device and rotary structure.

In another embodiment, the oven apparatus further comprises an operation opening coupled to a lower chamber of the oven housing, and a charcoal furnace, wherein the rotary structure has circular shape and is made of cast iron, and a center of the rotary structure has a through hole communicating with the upper and lower chamber, wherein the charcoal furnace is allowed to be elevated from the through hole and isolates the upper chamber from lower chamber. When the charcoal in the charcoal furnace is burned, the food inside the oven apparatus can receive charcoal broiled flavor.

In one embodiment, the oven apparatus further comprises a rotary motor and an elevator arranged in the lower chamber, wherein an end of the rotary motor has a gear coupled to a driven gear portion arranged on the rotary structure so that the rotary structure can be driven to rotate along central axis of the through hole, and the elevator utilized to control a vertical position of the charcoal furnace further comprises a positioning slot, an upper frame for supporting the charcoal furnace, an lower frame for supporting the upper frame, a foldable rod assembly coupled to the upper and lower frames for extending and folding along the vertical direction, and a control wheel for controlling the extending and folding operation of the foldable rod assembly through a rotation of the control wheel.

In one embodiment, the oven apparatus further comprises a motor module electrically coupled to the power module and the rotary motor for providing required power of the motor rotary, and the motor module is utilized to control the rotary motor for adjusting a rotation speed of the rotary structure thereby controlling the taste and flavor of the cooked object.

In one embodiment, the upper chamber further comprises a ventilation opening communicating with exterior environment through a ventilation conduit, and a suction motor coupled to the ventilation opening, wherein a pipe wall of the ventilation conduit further comprises a gas valve for controlling timing and rate of smoke emission.

In one embodiment, the oven housing further has a hollow space therein for forming a heat convection space communicating with the ventilation conduit whereby the excess heat collected from the housing is exhausted to the exterior environment through the ventilation conduit so as to prevent accumulation of excess heat from affecting heating control.

In one embodiment, the oven opening further comprises a main opening and two auxiliary openings respectively arranged at the two lateral sides of the main opening for increasing the width of the oven opening, the cover further comprises a main lid for covering the main opening and two lateral lids for covering the two auxiliary openings respectively, and a height of the charcoal furnace is smaller than a height of the oven opening so that the charcoal furnace is allowed to be arranged in the upper chamber through the oven opening. In addition, the front side of the cover further has a handle so that the operator can easily to grasp the cover.

In one embodiment, the oven apparatus further comprises a conduit assembly arranged around a top surface of the oven housing for guiding a fluid. In addition, the oven apparatus further comprises a storage unit communicating with the conduit assembly through pipeline, wherein the storage unit further comprises a pump for providing a movement power to drive water inside the storage unit to circulate in the conduit assembly.

In one embodiment, the oven housing further comprises a first shell structure and a second shell structure fixedly connected to the first shell structure or detachably connected to the first shell structure, an accommodating space is formed between the first and second shell structures, and the conduit assembly further comprises an inlet, a conduit segment, and an outlet, wherein the inlet and the outlet are respectively coupled to the second shell structure, and the conduit segment is arranged in the accommodating space.

All these objects achieved by oven apparatus according to the present invention are described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
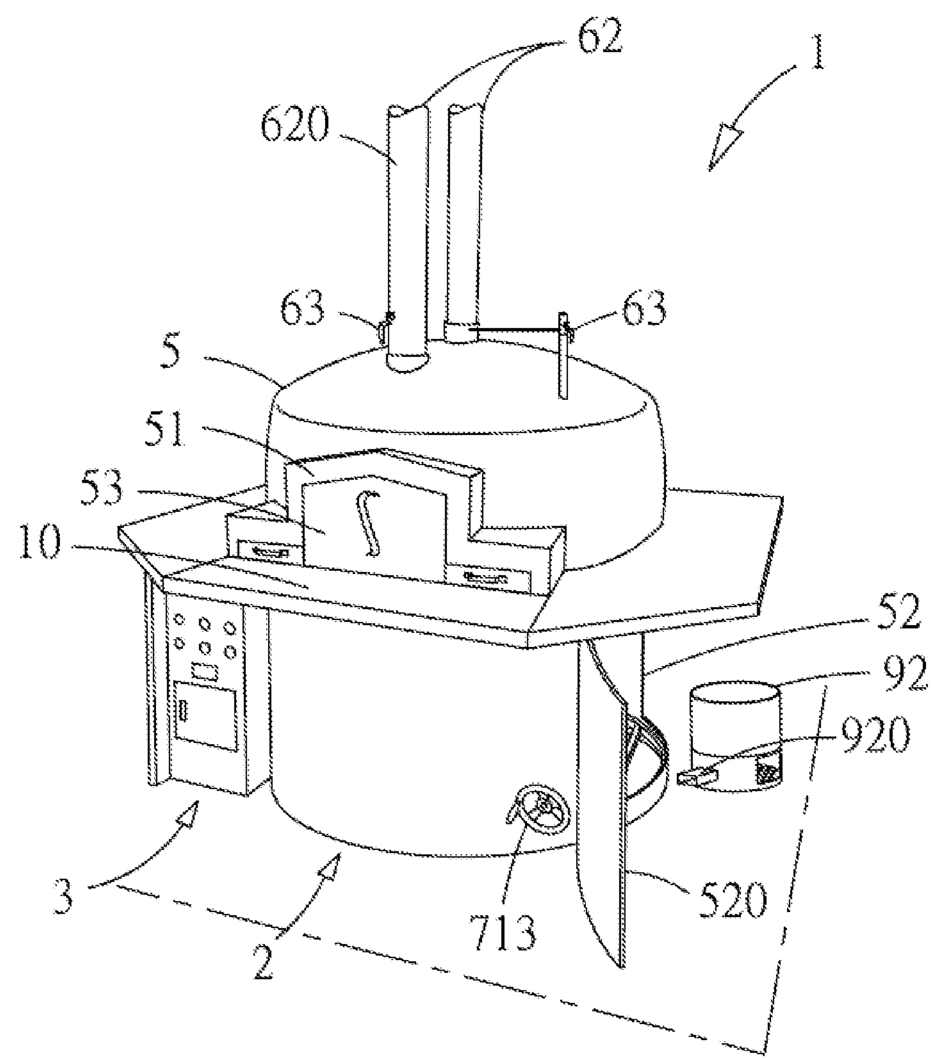
FIG. 1 illustrates an oven apparatus according to first embodiment of the present invention.
Figure 2:
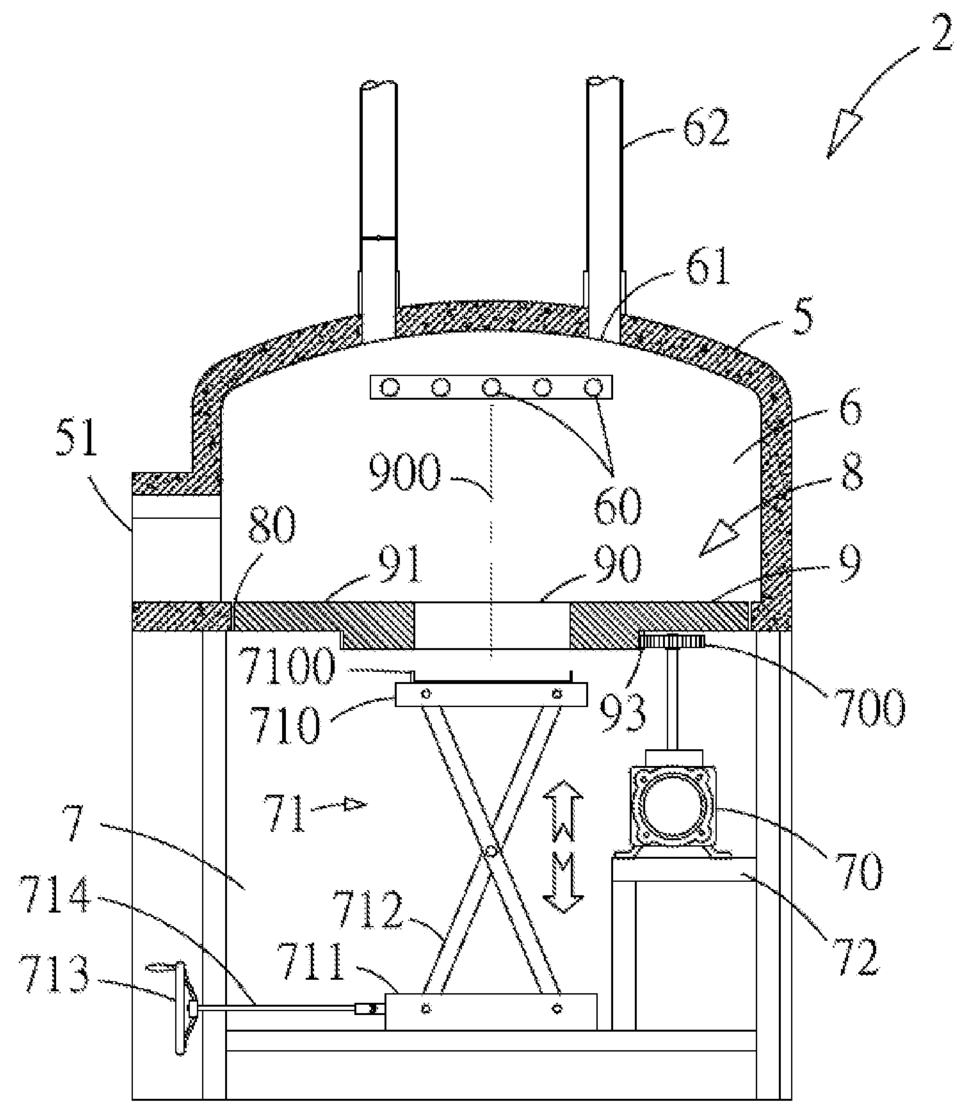
FIG. 2 illustrates a cross-sectional view of the oven apparatus according to the first embodiment of the present invention.
Figure 3:
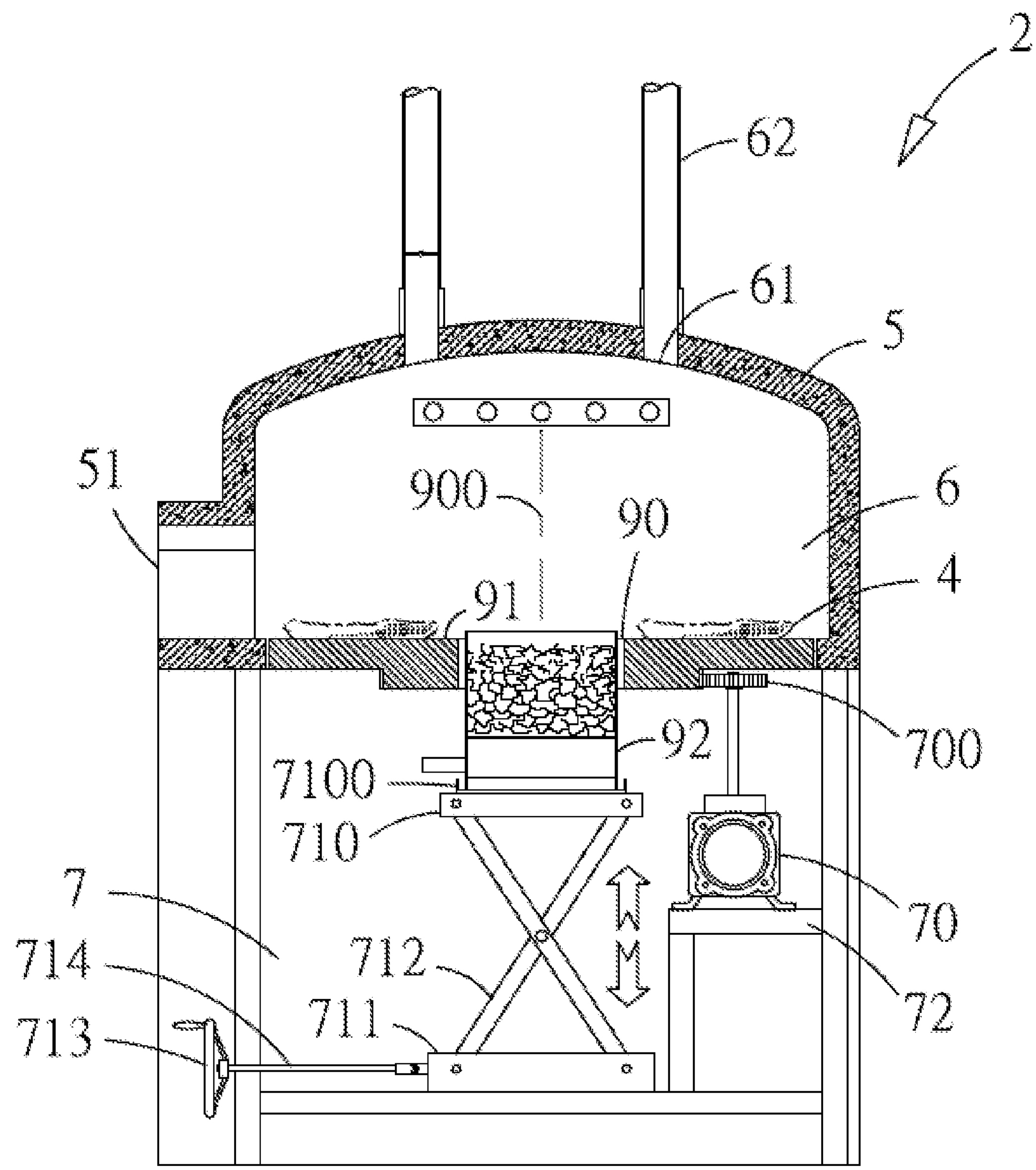
FIG. 3 illustrates a combination of charcoal furnace and elevator inside the oven housing.
Figure 5:
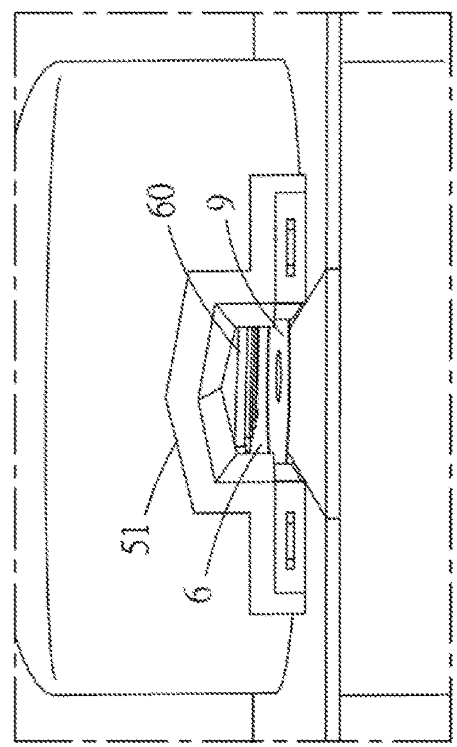
FIGS. 5 and 6 illustrate one embodiment to increase the width of the oven opening of the present invention.
Figure 4:
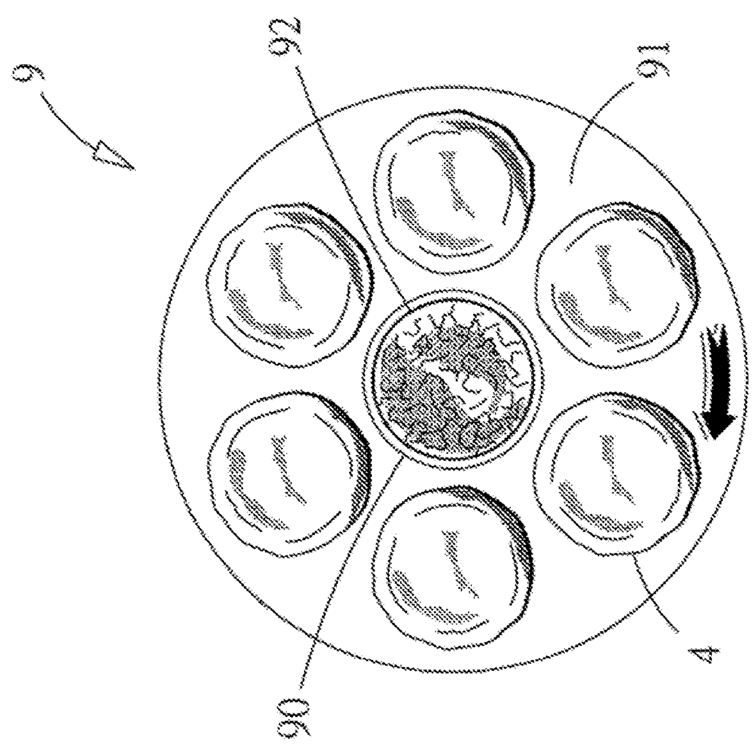
FIG. 4 illustrates a top view of the rotary structure according to one embodiment of the present invention.

The invention disclosed herein is directed to an oven apparatus. In the following description, numerous details corresponding to the aforesaid drawings are set forth in order to provide a thorough understanding of the present invention so that the present invention can be appreciated by one skilled in the art, wherein like numerals refer to the same or the like parts throughout.

Although the terms first, second, etc. may be used herein to describe various elements, components, modules, and/or zones, these elements, components, modules, and/or zones should not be limited by these terms. Various embodiments will now be described in conjunction with a number of schematic illustrations. The embodiments set forth oven apparatus than conventional approaches. Various embodiments of the application may be embodied in many different forms and should not be construed as a limitation to the embodiments set forth herein.

Please refer FIGS. 1 to 8 which illustrate oven apparatus according to a first embodiment of the present invention. The oven apparatus 1 comprises an oven portion 2 and an oven controller 3. The oven portion 2 further comprises an oven housing 5 made from metal material, wherein the oven housing 5 further comprises an oven opening 51 and an operation opening 52. The oven opening 51 is configured to be an entrance through which the object such as food can be arranged inside the oven housing 5. The food can be, but should not be limited to, meat, bread or pizza. A cover 53 is pivotably coupled to the frame of the oven opening 51 so that the cover 53 can seal the oven opening 51 very tightly and can prevent the heat from emitting to the exterior environment during cooking food.

The operation opening 52 is formed for conveniently supplying the charcoal, and maintaining the facility and structure within the oven housing 5. In addition, a dust-resistant cover 520 is arranged to cover the operation opening 52 for preventing unwanted object or dust from entering the oven housing 5 through the operation opening 52. In the present embodiment, the oven opening 51 is coupled to an upper chamber 6 of oven housing 5 while the operation opening 52 is coupled to a lower chamber 7 of oven housing 5. A support platform 8 is horizontally arranged between the upper chamber 6 and lower chamber 7, wherein a center part of the support platform 8 has a void space 80 so that a rotary structure 9 can be arranged in the void space 80. The rotary structure 9 has a circular profile and a center part of the rotary structure 9 further has through hole 90 communicating with the upper and lower chambers 6 and 7. The front surface of the rotary structure 9 close to the through hole 90 is defined as a heating zone 91 on which the object 4 required to be cooked or baked can be arranged thereon.

The rotary structure 9 rotates regularly about a central axis 900 of the through hole 90 in a specific direction, e.g., counterclockwise direction or clockwise direction. In the present embodiment shown in FIG. 4, the rotary structure 9 rotates in a clockwise direction. The rotary structure 9 is made from cast iron so that the rotary structure 9 has anti-abrasive and high hardness properties with superior heat conductivity and heatproof property thereby improving heat absorbing efficiency in cooking or baking process and shortening the cooking or baking time.

In addition, a charcoal furnace 92 having dimension smaller than the dimension of the through hole 90 can be elevated between the upper chamber 6, and lower chamber 7 by passing the through hole 90 so as to isolate the upper chamber 6 from lower chamber 7. It is noted that, after the charcoal is burned in charcoal furnace 92, the charcoal furnace 92 can be lifted to the upper chamber 6 whereby the object 4 inside the upper chamber 6 can receive the charcoal broiled flavor.

The upper chamber 6 further comprises a heating device 60 and at least one ventilation opening 61. In one embodiment shown in FIG. 5, the heating device 60 can be a plurality of heat pipes spread above the rotary structure 9 with a vertical distance from the rotary structure 9, and the interval between each heat pipe is the same as each other whereby heating area can be expanded and an effect of even heat distribution can be achieved. The ventilation opening 61 is communicated with exterior environment through a ventilation conduit 62, and a suction motor is coupled to the ventilation conduit 62 for enhancing the exhaust effect of the waste gas or smoke. In addition, a pipe wall of the ventilation conduit 62 further has valve 63 for controlling the factors of gas or smoke emission, such as timing of emission, and emission rate, for example.

In the lower chamber 7, it further comprises a rotary motor 70 and elevator 71, wherein the rotary motor 70 is arranged on a frame structure 72 such that the rotary motor 70 can be fixed on the frame structure 72. In the present embodiment, the frame structure 72 is integrated with the oven housing 5 so that the frame structure 72 and oven housing 5 are formed as one unit. One end of the rotary motor 70 further has a gear 700 while a location on the rotary structure 9 corresponding to the gear 700 has a driven gear 93 engaged with the gear 700 whereby the rotary structure 9 can be rotated when the driven gear 93 is driven to rotate by the gear 700 coupled to the rotary motor 70.

The elevator 71 arranged under the through hole 90 is provided to vertically move along central axis 900 for controlling a vertical position of the charcoal furnace 92. The elevator 71 further comprises a position confining element 7100 for confining the position of the charcoal furnace 92, an upper frame 710 for fixing the charcoal furnace 92, a lower frame 711 for providing supporting force to withstand the weight of the structures forming the elevator 71, a foldable rod assembly 712 coupled to the upper and lower frames 711 and 712 for extending and folding along the vertical direction, and a control wheel 713 is operated to control the extending and folding movement of the foldable rod assembly 712 thereby lifting or lowering the charcoal furnace 92 from the through hole 90. Accordingly, when the charcoal furnace 92 is arranged on the upper frame 710 through the operation opening 52, the charcoal furnace 92 can be lifted to the upper chamber 6 through the through hole 90 by rotating the control wheel 713 and provides the charcoal broiled flavor. In case of the charcoal is running out, the upper frame 710 can be lowered by rotating the control wheel reversely such that the charcoal furnace 92 can be taken out from the operation opening 52 and be supplied with charcoal. The elevator 71 and operation opening 52 are designed to conveniently load or unload the charcoal furnace 92 on/from the upper frame 710 so as to enhance the convenience of charcoal exchanging. The elevator 71 further comprises an extension rod 714 arranged between the foldable rod assembly 712 and control wheel 713 for increasing an operation distance of the control wheel 713 such that the control wheel 713 can be located outside the oven body whereby the operator can operate the control wheel 713 outside the oven housing 5. It is noted that the control wheel 713 can be rotated through man power or automatic power such as motor and gear assembly, for example.

Figure 6:
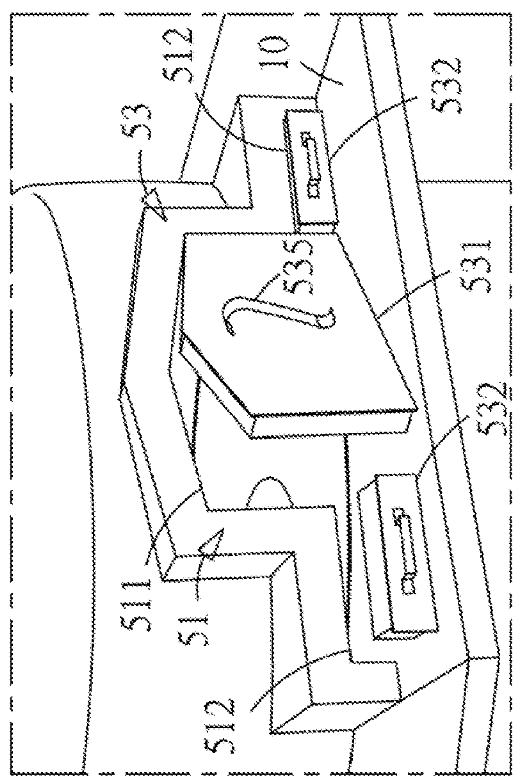
Figure 8:
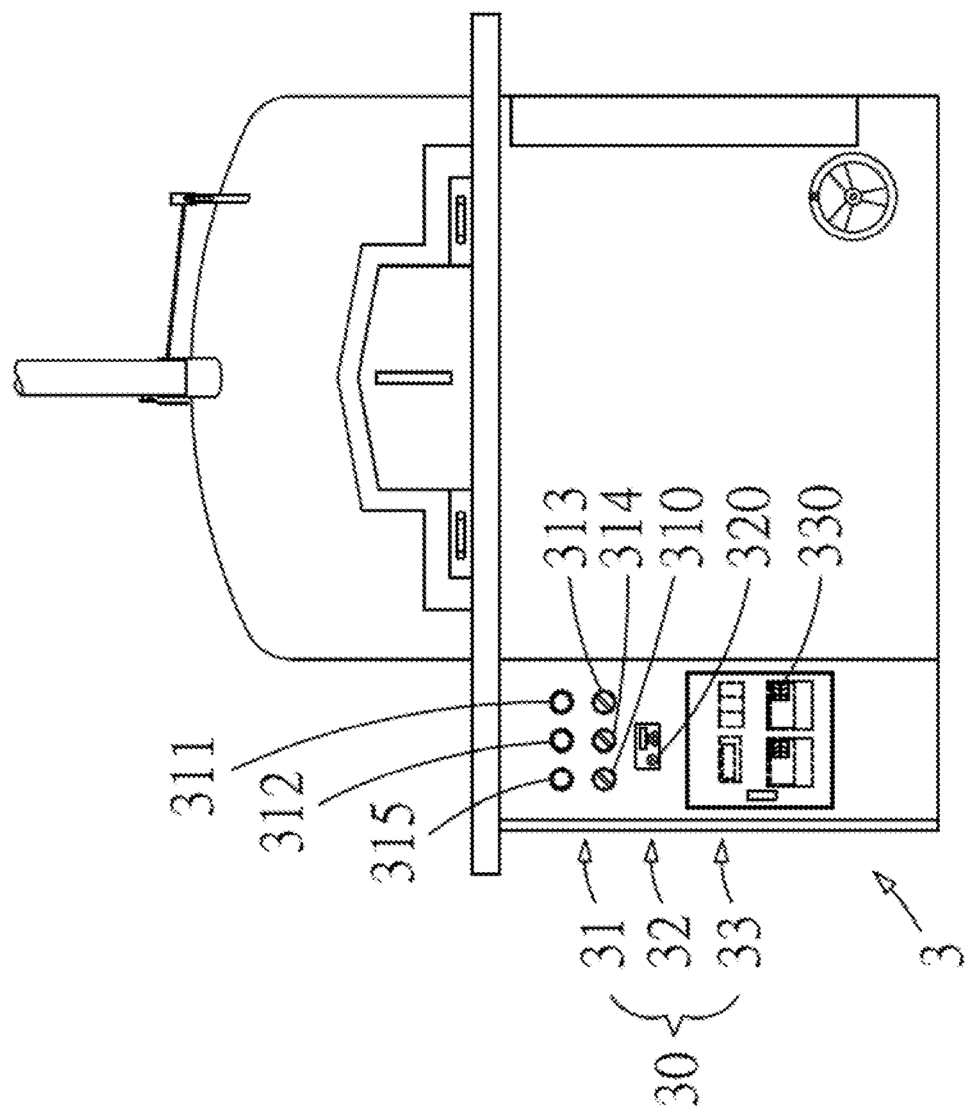
FIG. 8 illustrates a plurality of operation interfaces of the oven controller according to one embodiment of the present invention.

In one alternative embodiment shown in FIG. 6, the oven opening 51 can be expanded for allowing larger size object passing therethrough. In the present embodiment, the oven opening 51 further comprises a main opening 511 and two auxiliary openings 512 respectively arranged at the two lateral sides of the main opening 511 for increasing the width of the oven opening 51. Besides, the cover 53 further comprises a main lid 531 for covering the main opening 511 and two lateral lids 532 for covering the two auxiliary openings 512, respectively. Since the oven opening 51 is combined by main opening 511 and auxiliary openings 512, the opening width can be adjusted by optionally opening one or two the lateral lids 532 according to the size of the object 4. In addition, the front side of the cover 53 further has a handle 535 so that the operator can easily to grasp the cover 53.

Besides, the oven housing 5 further comprises a table plate 10 arranged around the outer surface of the oven housing 5, as illustrated in FIG. 1. In one embodiment, the height of the table plate 10 is the same as the support plate 8 and the bottom rim of the oven opening 51 so that the upper surface of the table plate 10, the upper surface of support plate 8, and the bottom end of the oven opening 52 are on the same plane whereby the object 4 can be delivered from the table plate 10 to the rotary structure 9 through the bottom end of the oven opening 51 smoothly. The outer wall of the charcoal furnace 92 further has a protrusion part 920 whereby the operator can fasten one end of elongated tool, such as iron rod or wood rod, to the protrusion part 920 and hold the other end of the elongated tool so as to easily load the charcoal furnace 92 on the upper frame 710 or unload the charcoal furnace 92 from the upper frame 710.

Figure 7:
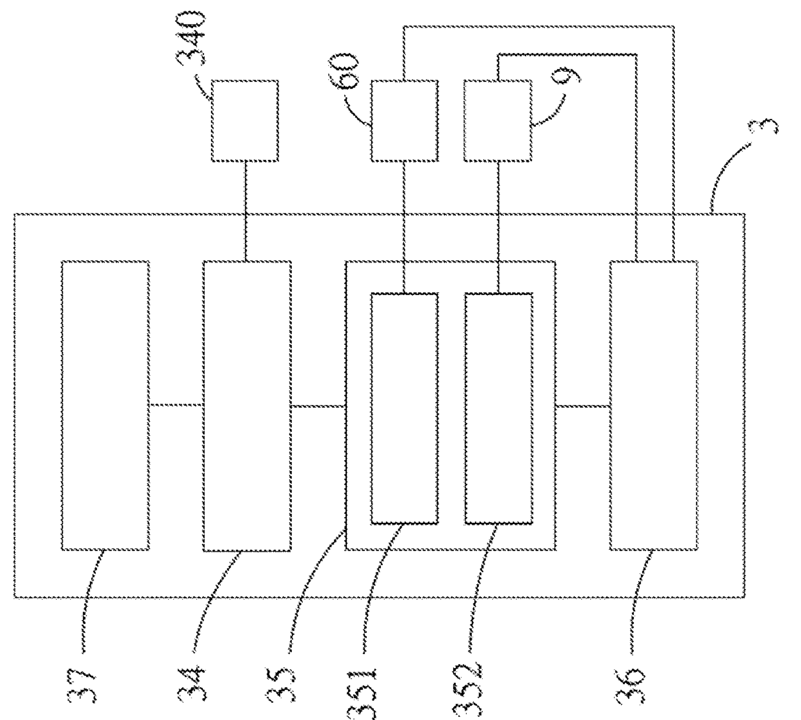
FIG. 7 illustrates one embodiment of the oven controller of the present invention.

The oven controller 3 shown in FIG. 7 further comprises a power module 34, a heating control module 35, a sensing module 36 and motor module 37. The power module 34 is coupled to external power source, such as mains electricity, for providing electricity requirement of the oven apparatus 2. The heating control module 35 is coupled to the power module 34 and further comprises a first heat control unit 351, and a second heat control unit 352, wherein the first heat control module 35 is electrically coupled to the heating devices 60, e.g., a plurality of heat pipes, and the second heat control unit 352 is electrically coupled to rotary structure 9. The first and second heat unit 351 and 352 are utilized to provide heat energy to the heating device 60 and rotary structure 9 and each of which provides an interface for setting a predetermined temperature. Accordingly, the heating control module 35 can transform the electrical energy into heat energy through joule effect such that the heat energy can be transferred to the object 4 through the rotary structure 9 under the object 4 as well as the heating device 60 above the object 4. In addition, the regular rotation of the rotary structure 9 can also make the heat absorption effect of object 4 faster, more stable and more even.

The sensing module 36 is electrically coupled to the heating control module 35 for monitoring instant temperature of heating device 60 and rotary structure 9. When the instant temperature of the heating device 60 or rotary structure 9 is over the predetermined temperature, an alarm message or sound is generated to inform the operator so that the operator can precisely catch the timing when the object is properly cooked.

The motor module 37 is electrically coupled to the power module 34 and rotary motor 70 for providing the electrical power that the rotary motor 70 is required. The motor module 37 is utilized by the operator to control the rotating speed of the rotary structure 9 such that the taste and flavor of the object 4 inside the oven apparatus 1 can be controlled by the operator through adjustment of rotating speed of the rotary structure 9, the temperature control of the heating device 60 and the operation of the charcoal furnace 92 and the ventilation conduit 62.

In addition, the oven controller 3 further comprises front panel through which the operator can operate and control the oven apparatus. In one embodiment, the front panel of the oven controller 3 has a plurality of operation interfaces 30 illustrated as FIG. 8, which includes a first interface 31, a second interface 32, and a third interface 33. The first interface 31 is electrically coupled to the power module 34, motor module 37, and a heating control module 35, and further comprises a power switch 310, a motor switch 315, alarm lamp 311 of heating device 60, an alarm lamp 312 of rotary structure 9, an alarm lamp switch 313 of the heating device 60, and an alarm lamp switch 314 of rotary structure 9. The second interface 32 is electrically coupled to the motor module 37, and further comprises adjusting knob 320 for adjusting motor speed. The third interface 33 is electrically coupled to the heating device 60 and further comprises a display 330 for showing the instant temperature and predetermined temperature of the heating device 60 and rotary structure 9 so as to provide convenience of operation.

Figure 9:
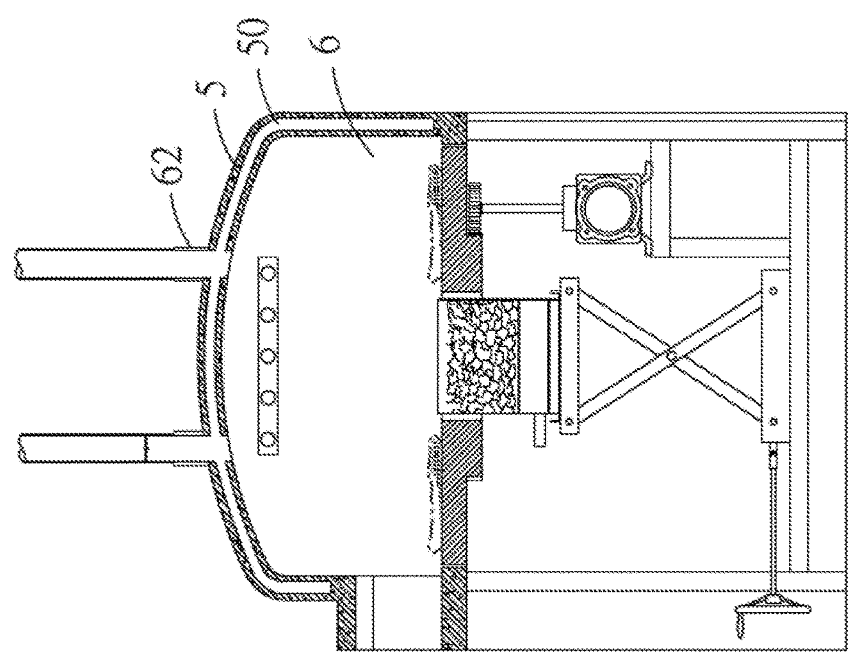
FIG. 9 illustrates an oven apparatus according to a second embodiment of the present invention.

Please refer to FIG. 9, which illustrates oven apparatus according to a second embodiment of the present invention. The difference between the present embodiment and the first embodiment is that the upper chamber 6 of the oven apparatus 1 has a hollow space between two chamber shells such that a convection space 50 (convection layer) is formed to communicate with the ventilation conduit 62 for emitting excess heat energy collected from the oven housing 5 to exterior environment through the ventilation conduit 62 whereby the heat energy over accumulated can be averted to reduce adverse factors that may affect the temperature control of the oven housing 5.

Figure 10A:
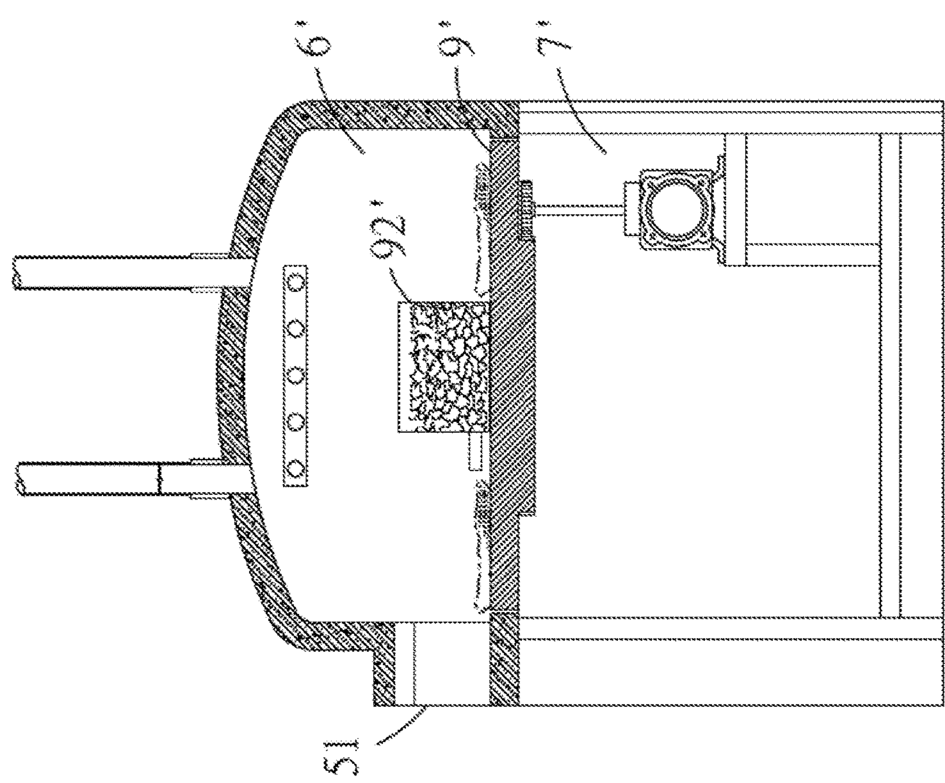
FIGS. 10A and 10B illustrate an oven apparatus according to a third embodiment of the present invention.
Figure 10B:
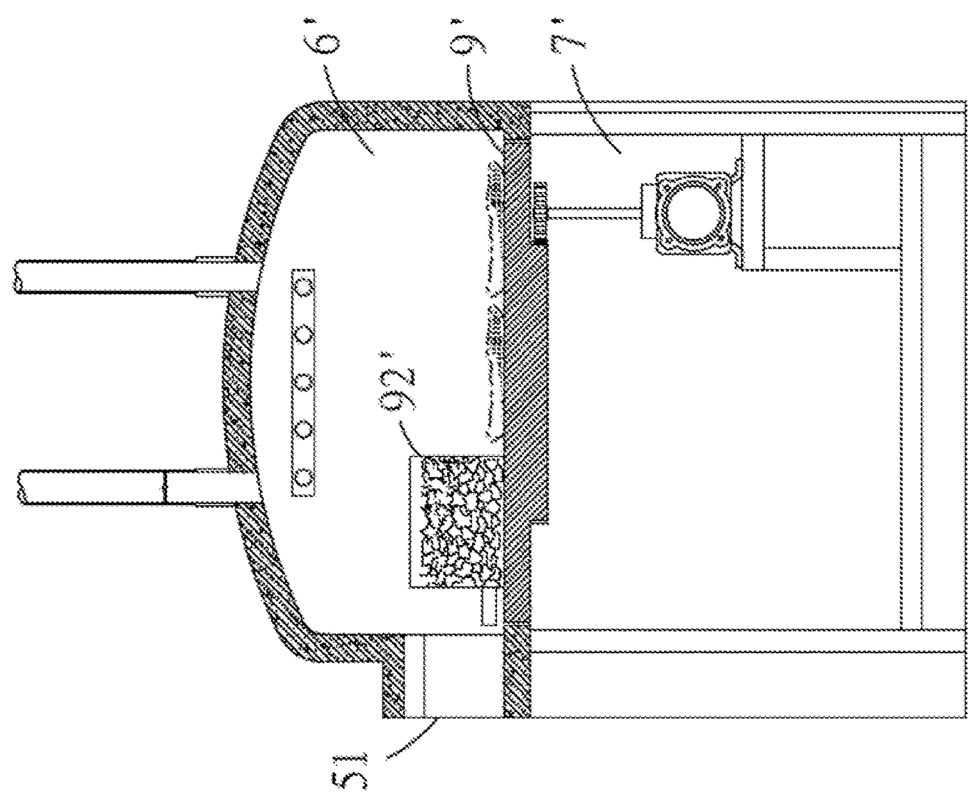

Please refer to FIGS. 10*a* and 10*b*, which illustrate alternative oven apparatus according to a third embodiment of the present invention. In the present embodiment, the difference part from the first embodiment is that the rotary structure 9' is a circular and solid plate for isolating the upper chamber 6' from lower chamber 7'. There has no through hole at the center of the rotary structure 9' and there has no elevator inside the lower chamber 7'. Besides, the height of the charcoal furnace 92' is smaller than the height of the oven opening 51 so that the charcoal furnace 92' can be delivered into the upper chamber 6' through the oven opening 51 wherein the charcoal furnace 92' can be optionally arranged at the center of the rotary structure 9' illustrated as FIG. 10A, or arranged at a lateral side of the upper chamber 6' illustrated as FIG. 10B, both of which can increase the charcoal broiled flavor on the object on the rotary structure 9'.

Figure 11A:
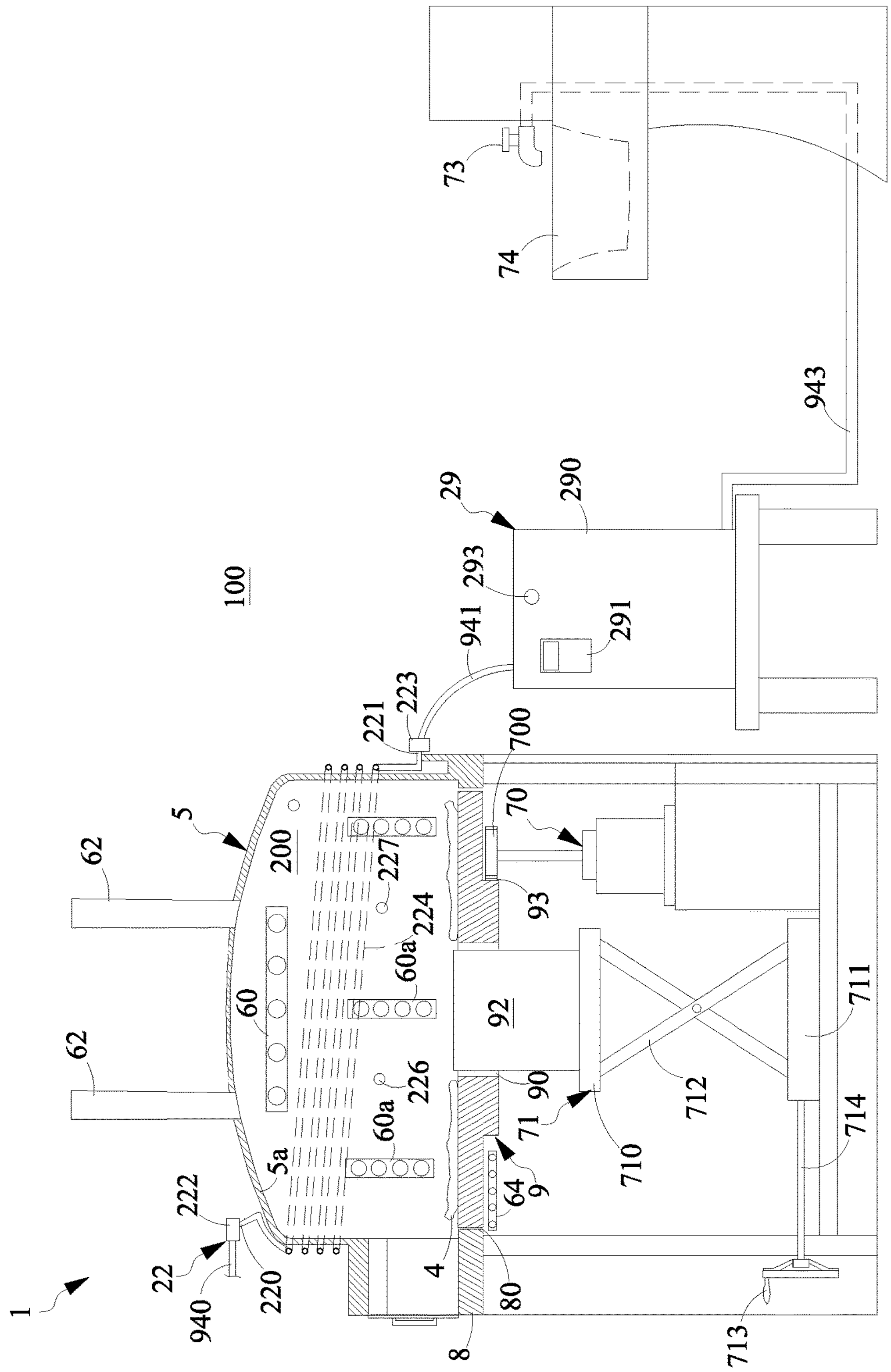
FIG. 11A illustrates a conduit assembly arranged around a top of the oven apparatus having single shell structure.

Please refer to FIG. 11A, which illustrates another oven apparatus according to the third embodiment of the present invention. In the present invention the oven housing 5 is formed by a single shell structure 5*a*. In the embodiment shown in FIG. 2A, the oven apparatus 1 further comprises a conduit assembly 22 arranged around a top surface of oven housing 5, wherein the conduit assembly 22 has an inlet part 220, a conduit segment 224 and an outlet part 221. The inlet part 220 further comprising a first valve 222 and the outlet part 221 has a second valve 223, wherein the first valve 222 is coupled to a supply conduit 940 coupled to a water source providing cool water and the second valve 223 is coupled to storage unit 29 through pipeline 941.

In the present embodiment, at least one temperature sensor 226 is arranged on the first shell structure 5*a* for detecting temperature inside the oven interior space 200 and transmitting the temperature signal to the oven controller 3. The first shell 5*a* further comprises a pressure sensor 227 for detecting the pressure inside the oven interior space 200 and transmitting the pressure signal to the oven controller. The oven controller controls the actuation of the heating device 60 and 60*a* according to the detected temperature signal and controls valve of ventilation conduit 62 in open or close status or opening size of the valve of ventilation conduit 62 according to the detected pressure signal. It is noted that the heating device 60 and 60*a* can be arranged at the top of the oven interior space 200, around the oven interior space 200, or the combination thereof, which is determined according to the need without any specific limitation.

It is noted that a second heating device 64 is arranged at a side of the rotary structure 9 for heating the rotary structure. The second heating device 64 can be tubular electric heater, or coil heater. The second heating device can be attached a bottom surface of the rotary structure 9 shown in FIG. 11A or embedded inside the rotary structure 9. Alternatively, the second heating device 64 can be a gas heater arranged a distance away from the bottom surface of the rotary structure 9. In addition, the second heating device can also be a charcoal fire.

The conduit segment 224 is spirally arranged outside the shell structure 5*a*. In one embodiment, the conduit segment 224 is lean against the shell structure 5*a*. Alternatively, the conduit segment 224 can also be arranged at a specific distance away from the shell structure 5*a*. It is noted that the number of turns of the conduit segment 224 on the top of the shell structure 5*a* and the interval between two adjacent turns are depending on the need of user, which is not limited by the illustration of the present invention.

The storage unit 29 further comprises a water tank 290, a control unit 291 and a temperature sensor 293, wherein the water tank 290 is coupled to the second valve 223 through pipeline 941 and is coupled to a water providing facility 73, such as faucet or water-tap. Alternatively, the storage unit 29 is coupled to a cooking device or drinking device, e.g., coffee machine or tea making machine that requires hot water. In addition, a water sink 74 is arranged at a side of the water providing facility 73.

The temperature sensor 293 is utilized to detect the temperature of water in side the water tank 290. The temperature sensor 293 is electrically coupled to a control unit 291. The temperature sensor 293 transmits detected signals about the temperature of water to the control unit 291. Besides, the control unit 291 can be further electrically coupled to the first and second valves 222 and 223, so that the control unit 291 can adjust the ON/OFF of the first and second valves 222 and 223 or adjust the water rate and amount entering the conduit segment 224 through the first and second valves 222 and 223 thereby controlling the water temperature.

For example, when the temperature of water in the water tank 290 is insufficient, the control unit 291 can slow down the flow speed and reduce the flow amount inside the conduit segment 224 by controlling the first and second valves 222 and 223 so as to increase the time that the cool water stays inside the conduit segment 224 thereby increasing the water temperature. Conversely, if the temperature of water in the water tank 290 is over the predetermined temperature, the valve port of the first and second valves 222 and 223 can be adjusted to the maximum by the control unit 291 so that the flow rate and amount is increased to shorten the time that the water stays inside the conduit segment 224 thereby reducing the temperature of water in the water tank 290.

In one alternative embodiment, the water tank 290 of the storage unit 29 is further directly coupled to a cool water providing pipeline where valves can be configured so that the control unit 291 can control the flow rate and amount thereby adjusting the temperature of water in the water tank 290. It is noted that the control unit 291 and oven controller 3 shown in FIG. 1 can be two separated units or combined as one unit.

Figure 11B:
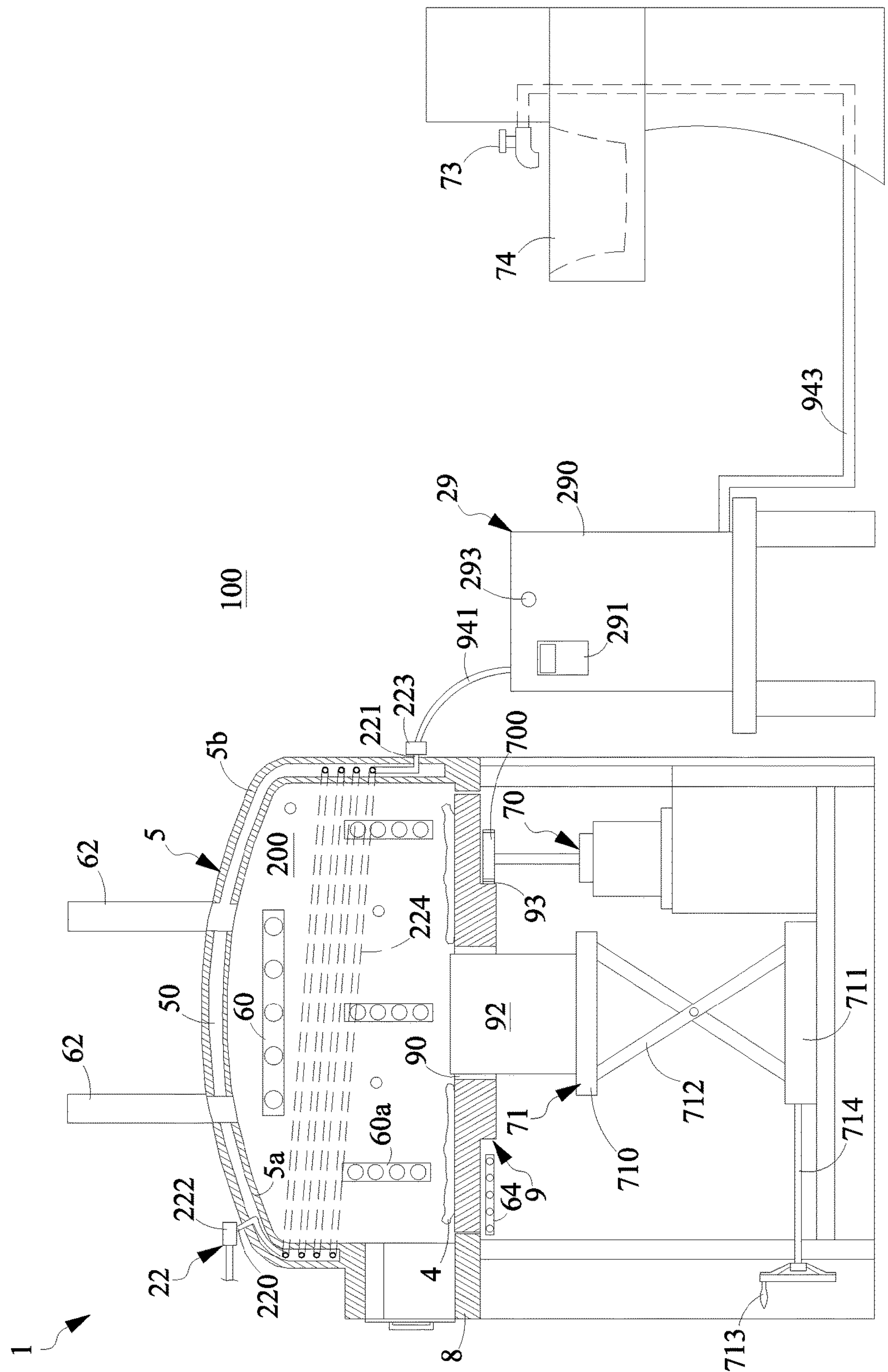
FIG. 11B illustrates a conduit assembly arranged in an accommodating space defined by two shell structures of the oven apparatus.
Figure 14:
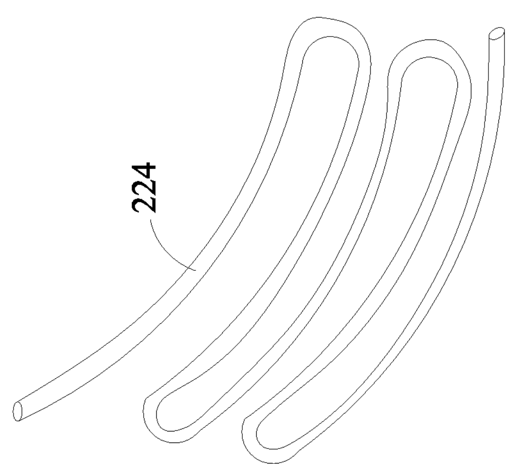
FIG. 14 illustrates another embodiment of the conduit segment.

In addition to the single shell structure shown in the FIG. 11A, alternatively, please refer to the embodiment shown in FIG. 11B, which illustrates another embodiment of the oven housing. In the FIG. 11B, the oven housing further comprises a first shell structure 5*a* and a second shell structure 5*b*, and an accommodating space 50 is formed between the first and second shell structures 5*a* and 5*b* such that the second shell structure 5*b* can prevent the operator from touching the conduit assembly 22 or first shell 5*a* having high temperature accidentally and also can prevent the conduit assembly 22 from exposing thereby creating great-looking appearance of the oven apparatus 1. The conduit assembly 22 is accommodated within the accommodating space 50. In the present embodiment, the conduit segment 224 is spirally arranged outside the shell structure 5*a*. It is noted that the conduit segment 224 in the accommodating space 50 is not limited to a spiral arrangement, and the conduit segment 224 can also be arranged around the first shell structure 5*a* in a form shown in FIG. 14.

In the embodiment shown in FIG. 11B, the second shell structure 5*b* is fixedly connected to the first shell structure 5*a*. The measure for fixing the two shell structures can be, but should not be limited to, a welding process. In addition to the fixed connection, in one embodiment shown in FIG. 11C, wherein the second shell structure 5*b* is detachably connected to the first shell structure 5*a* through a plurality connecting elements 206, such as rivets, screws or bolts. Accordingly, when it is necessary to maintain the conduit assembly 22 inside the accommodating space 50, the second shell structure 5*b* can be removed from the first shell structure 5*a*. Alternatively, a maintenance opening is configured on the second shell structure 5*b* with a maintenance door coupled thereto so that the operator can open the maintenance door and maintain the conduit assembly 22 inside the accommodating space 50.

Figure 11C:
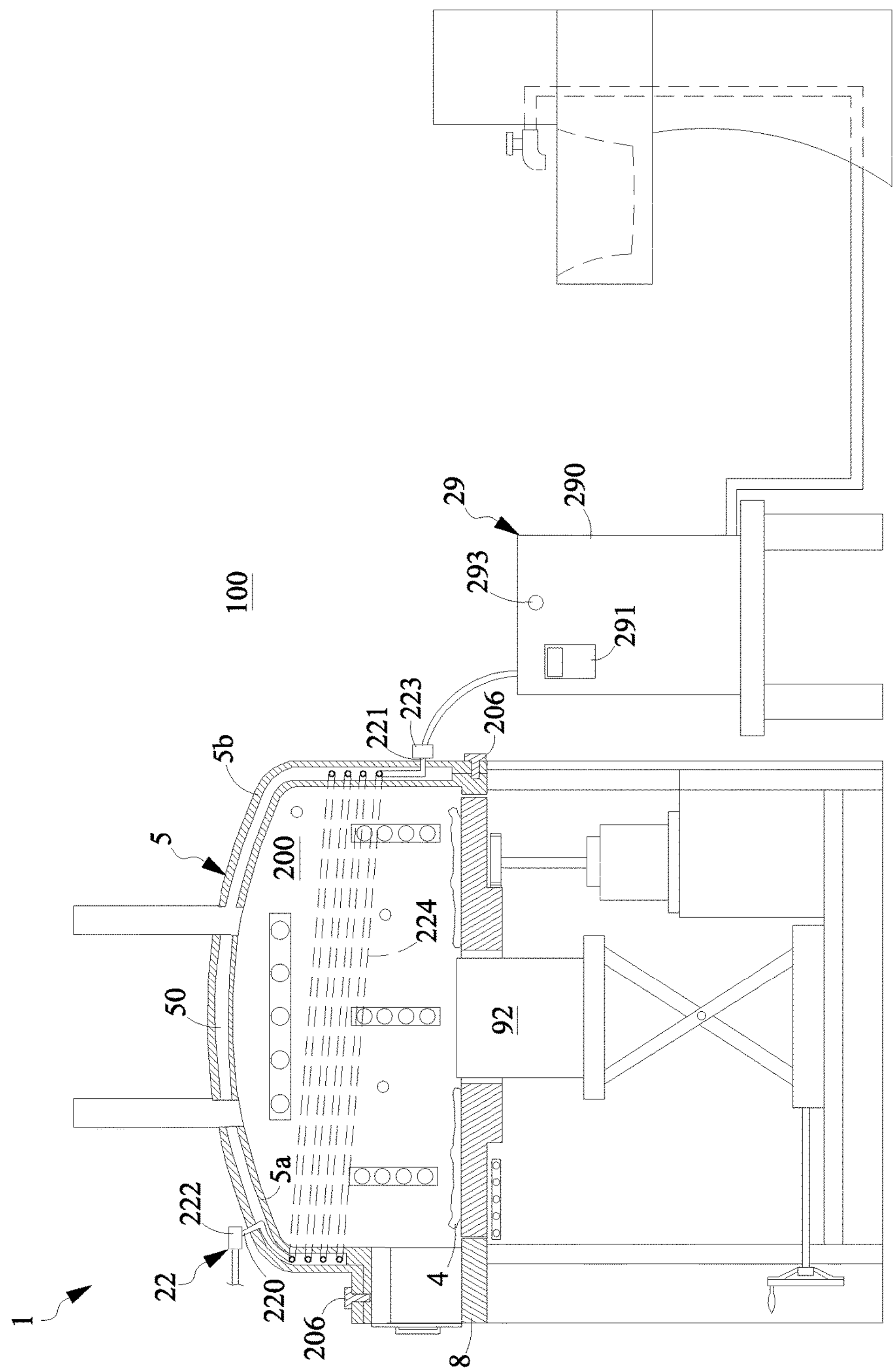
FIG. 11C illustrates another embodiment for connecting the first and second shell structures.

In the embodiments shown in FIGS. 11A to 11C, the first or second shell structure 5*a* or 5*b* is made from a metal material such as stainless steel, or cast iron. Alternative, the shell structures 5*a* and 5*b* can also be formed by bricklaying, such as fire brick. Since there has an accommodating space 50 between the two shell structures 5*a* and 5*b*, the accommodating space 50 can be an isolation layer for preventing the heat inside the oven interior space 200 from being transmitted to the exterior environment 100. In one alternative embodiment, the outer surface of the second shell structure 5*b* can further has an isolating layer, such as clay layer, coated thereon for preventing the operator from being burned when accidentally touching the shell structure.

Figure 11D:
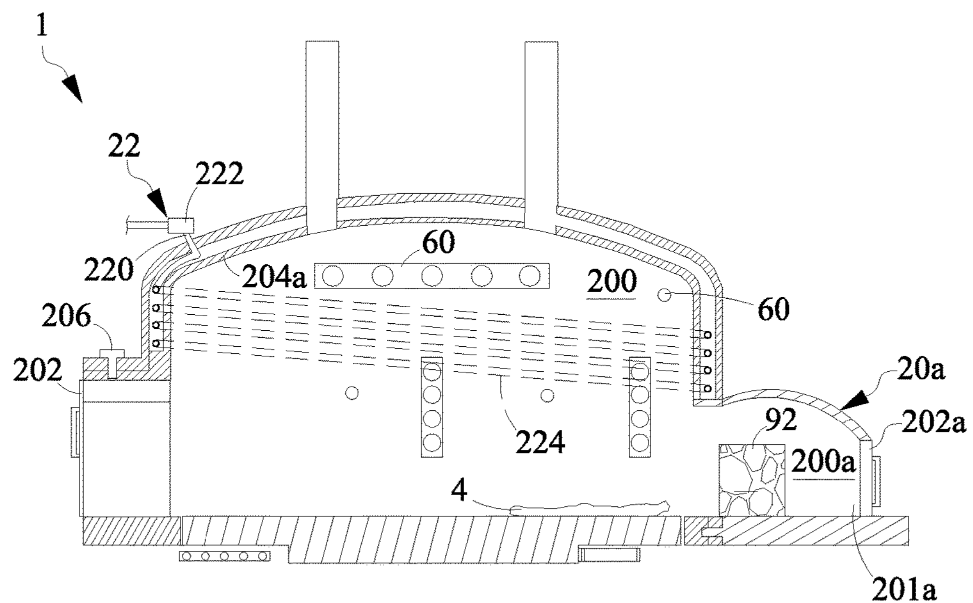
FIG. 11D illustrates an auxiliary oven coupled to the oven housing according to another embodiment of the oven apparatus of the present invention.
Figure 11E:
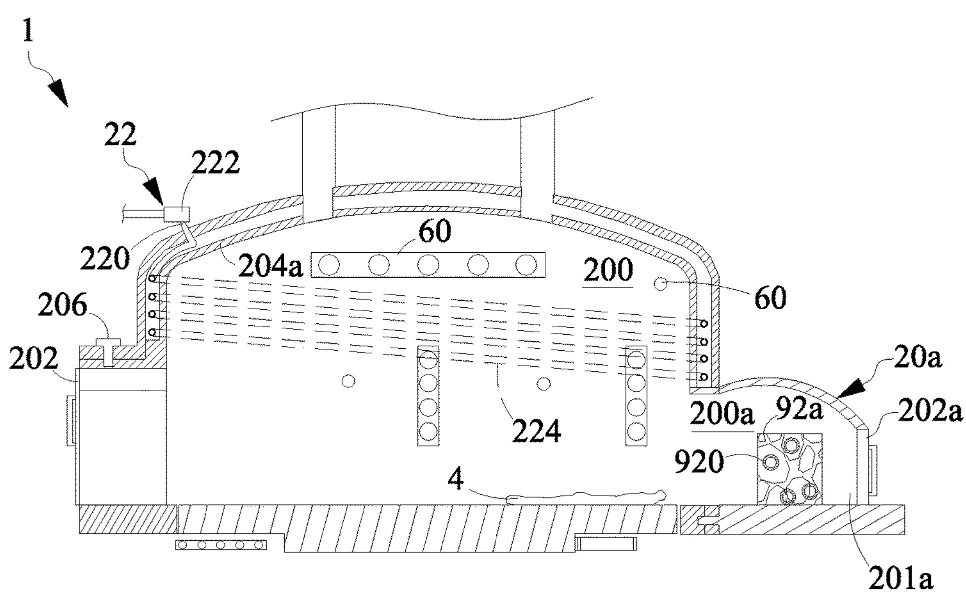
FIGS. 11E to 11G illustrate different embodiment of auxiliary unit coupled to the oven housing.

In addition to the embodiment shown in FIGS. 11A-11C, alternatively, such as embodiments shown in FIGS. 11D and 11E, an auxiliary oven 20*a* having an auxiliary space 200*a* is communicated with the oven interior space 200 in which the charcoal furnace 92 can be arranged so as to make the food have more charcoal broiled flavor. A lateral side of the auxiliary space 200*a* has an auxiliary oven opening 201*a* having auxiliary cover 202*a* coupled thereto. It is noted that the auxiliary oven opening 201*a* and auxiliary cover 202*a* is not the necessary element for constructing the auxiliary oven 20*a* which means that the auxiliary oven 20*a* can also be operated without the auxiliary oven opening 201*a* and auxiliary cover 202*a*. In addition the charcoal furnace arranged in the auxiliary space 200*a*, in the embodiment shown in FIG. 11E, the auxiliary space 200*a* can further has an auxiliary unit 92*a* comprising a heat lamp 920, such as halogen lamp or LED lamp, for providing auxiliary heat. Other alternative embodiment, the auxiliary unit 92*a* can be made in a form of charcoal furnace or wood pile for emulating the burning status through the heat and light generated by the heat lamp 920.

Figure 11F:
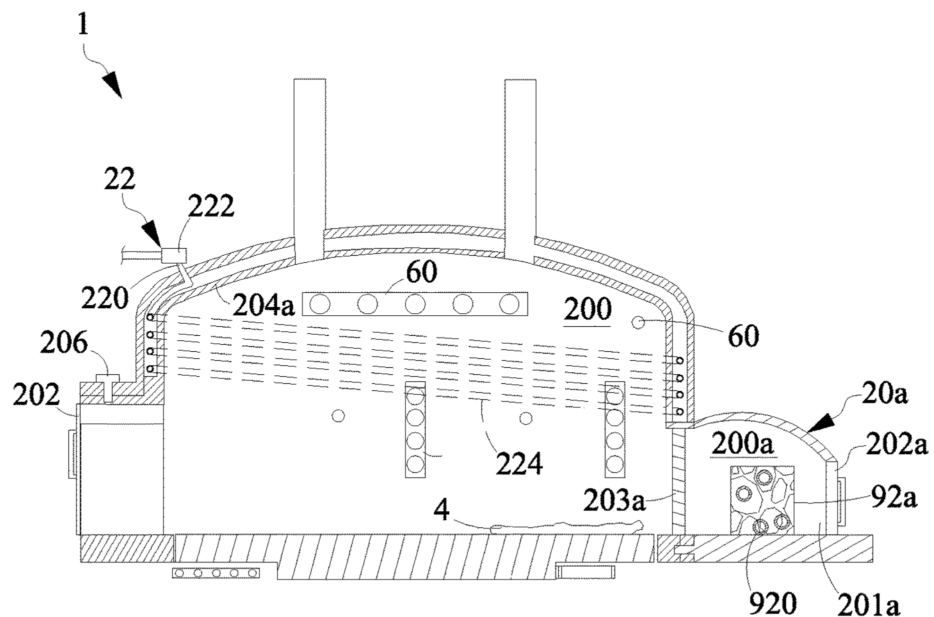
Figure 11G:
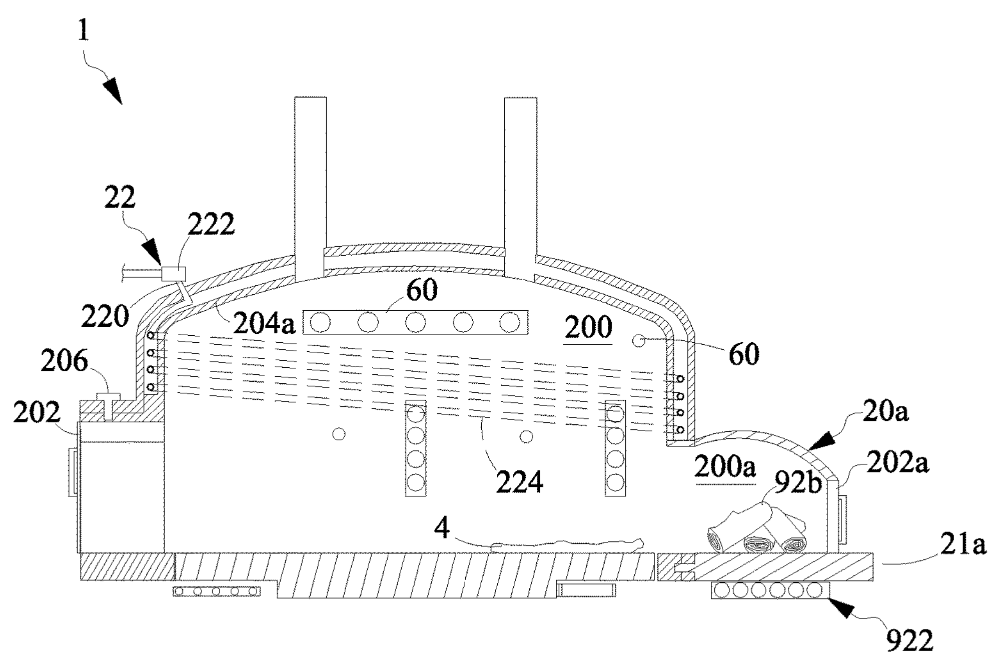

Please refer to FIG. 11F, in one embodiment, a transparent isolating plate 203*a*, such as tempered glass, is disposed between the oven interior space 200 and auxiliary space 200*a* for preventing the heat in the oven interior space 200 from damaging the auxiliary unit 92*a* in the auxiliary oven 2*a* and for allowing the light emitted from the auxiliary unit 92*a* to enter the oven interior space 200 through the transparent isolating plate 203*a*. In addition, as shown in FIG. 11G, in one embodiment, the bottom plate 21*a* of the auxiliary oven 20*a* can be a transparent plate, such as transparent tempered glass, for allowing lights generated from a light lamb 922 arranged under the bottom plate 21*a* to pass therethrough and enter the auxiliary space 200*a* in the auxiliary oven 20*a* so that the auxiliary unit 92*b*, a wood pile in this embodiment, can generate fire burning effect. It is noted that the transparent plate 203*a* shown in FIG. 11F and transparent bottom plate 21*a* shown in FIG. 11G can also be applied in the other embodiments of the present invention.

Figure 12:
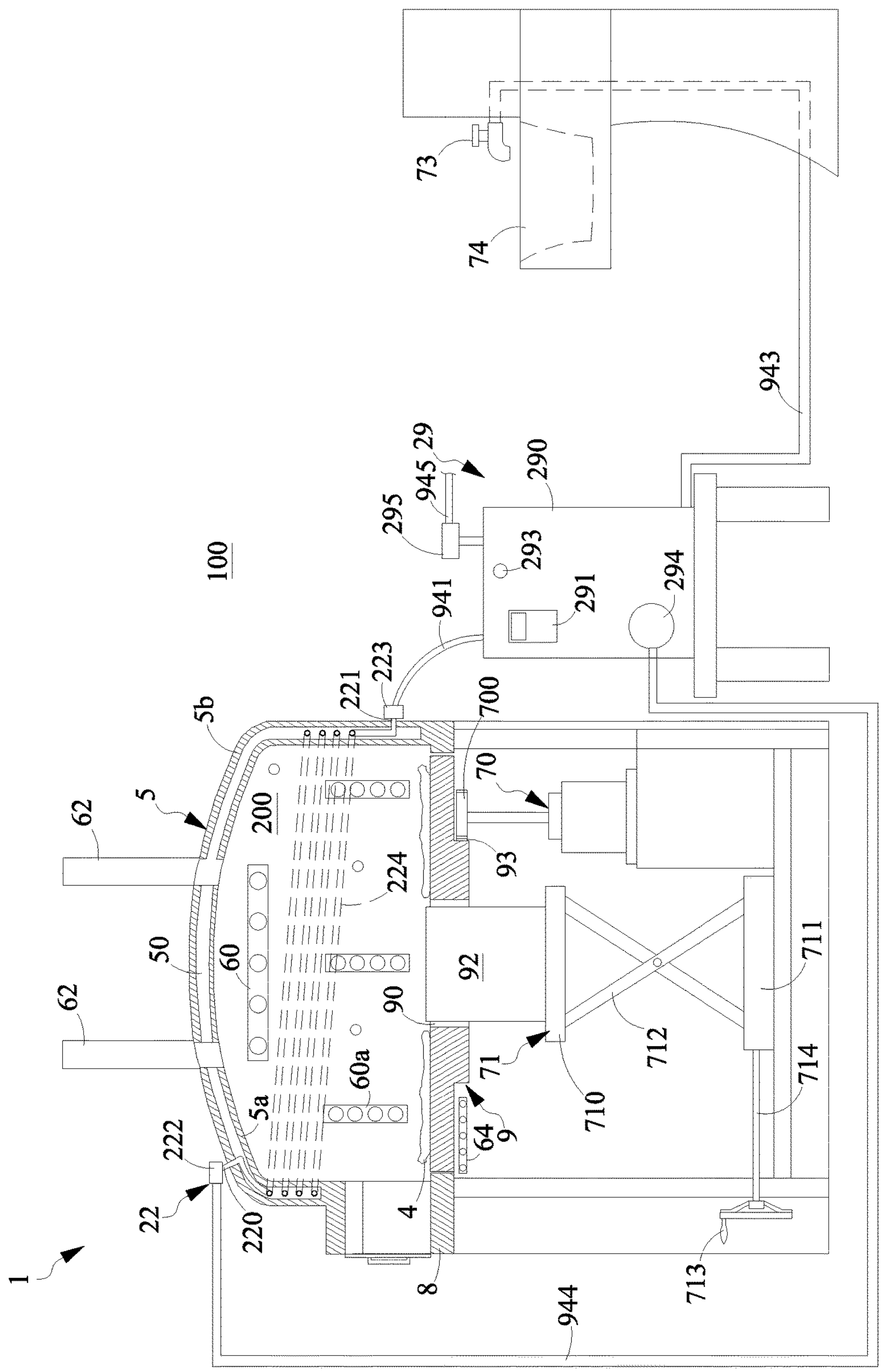
FIG. 12 illustrates another embodiment of the storage unit of the oven apparatus.

Please refer to FIG. 12, which illustrates another embodiment of oven apparatus. In the embodiment shown in FIG. 12, the conduit assembly 22 and storage unit 29 are different from the other embodiments. In the present embodiment, the storage unit 29 further has a pump 294, and the inlet part 220 of the conduit assembly is coupled to the pump 294 directly through pipeline 944. The pump 294 is also electrically coupled to the control unit 291; therefore, the control unit 291 can perform ON/OFF control to the pump 294. The outlet part 221 and second valve 223 are the same as the previous embodiments, which will not be described hereinafter. In the present embodiment, the storage unit 290 further comprises a third valve 295 coupled to pipeline 945 transmitting the cool water.

An operation of embodiment shown in FIG. 12 is described hereinafter, the control unit 291 transmits control signal to switch the third valve 295 in ON status such that the cool water can be poured into water tank 290. When the water level in the water tank 290 arrives at a predetermined level, the control unit 291 is operated to switch the third valve to OFF status. It is noted the level detection can be achieved through weight detector or water level detector, which is well known by the one skilled in the art. After that, the control unit 291 monitors the temperature of water in the water tank 290 through the temperature sensor 293. If the temperature is under a predetermined valve, the pump 294 is actuated and the first and second valves 222 and 223 are switched to ON status such that the pump 294 can pump the water from the water tank 290 into the conduit segment 224 through the inlet part 220. When the water is pumped into the conduit segment 224, the water can absorbs heat from the oven housing 5 thereby increasing the water temperature and finally, the heated water returns the water tank 290 and is circulated continuously till the temperature of water in the water tank 290 reaches the predetermined value. When the temperature is reached to the predetermined temperature, the control unit 291 can switch the first and second valves 222 and 223 in OFF status and stop the pump 294. On the other hand, if the temperature of water in the water tank 290 is over the predetermined value, in one embodiment, the control unit 291 switches the third valve 295 in ON status so that the cool water can be poured into the water tank 290 directly so as to reduce the water temperature.

Figure 13:
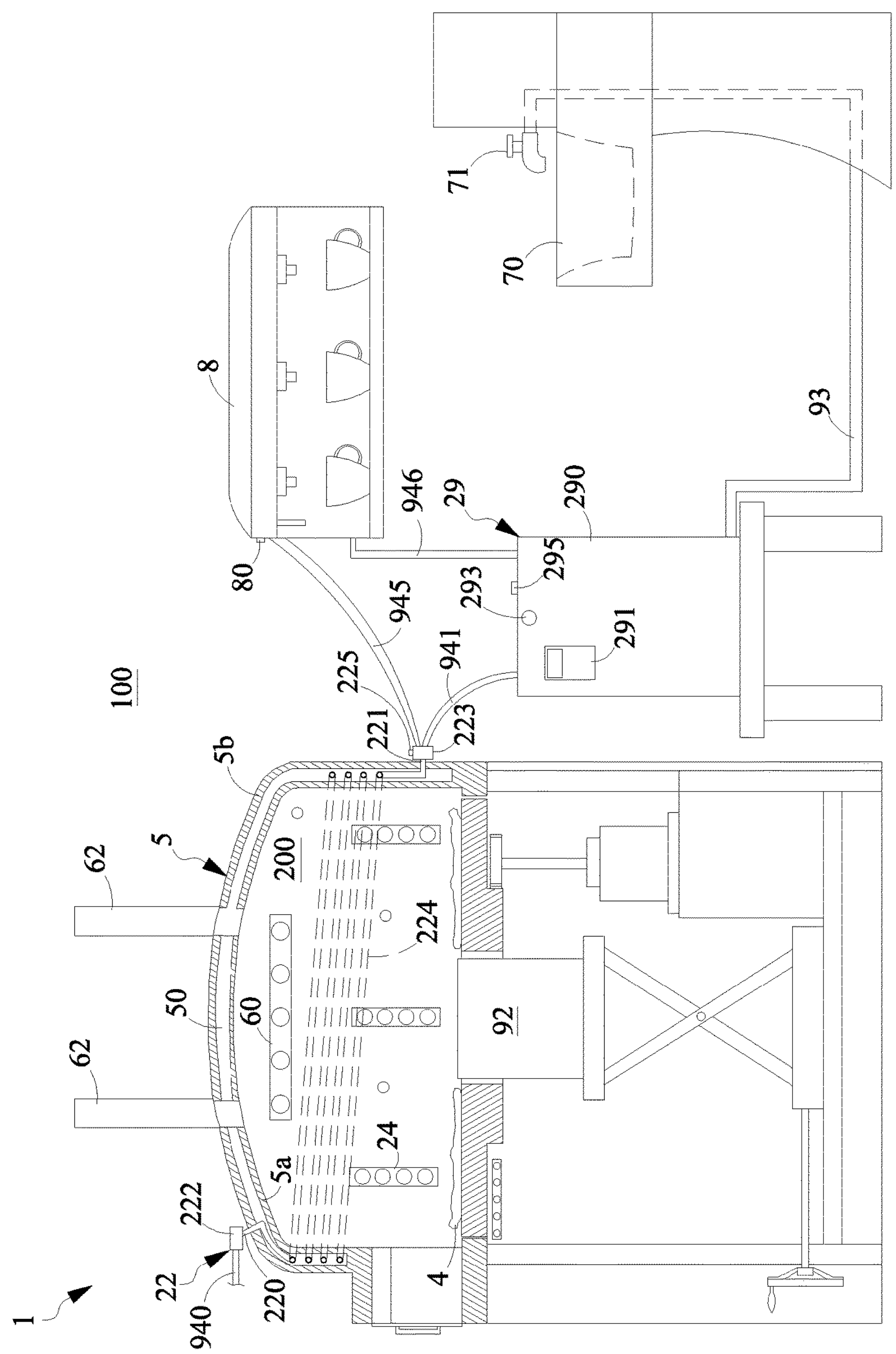
FIG. 13 illustrates another embodiment of the storage unit coupled to a food processor.

The above-mentioned embodiments are examples for generating hot water. In alternative embodiment, the oven apparatus 1 having conduit assembly 22 can also be utilized to generate water steam or combination of hot water and water steam. In one embodiment for generating water steam, please refer to FIG. 13, the second vale 223 is a one-to-many valve that can be utilized to divide one water flow into multiple sub-flows, wherein one outlet port is communicated with the storage unit 29, and the other outlet port is communicated with the food processor 8 through pipeline 945. In the present embodiment the food processor 8 is a coffee machine. The pipeline 945 is utilized to delivery water steam to the food processor 8 for preparing coffee or milk bubble.

In addition, the storage unit 29 is further communicated with the food processor 8 through the pipeline 946 for providing hot water that is required when preparing the food. In the present embodiment, the control unit 291 controls first and second valves 222 and 223 for adjusting the water amount into the conduit segment 22 so that the flow exits from the outlet port 221 is hot water steam which further flows into the food processor 8 through pipeline 945. On the other hand, it is capable of controlling the length of the pipeline 941 by making the pipeline 941 in a form of multiple rounds so that the hot water steam can be cooled to become hot water and then flows into the storage tank 290 through pipeline 941. In another embodiment, the food processor 8 and water tank 290 of storage unit 29 can further have pressure relief valve 295 for safety protection. It is noted that the location of pressure relief valve 295 is depending on the need and safety concerned which is not limited to the position shown in the drawing.

In addition, in another embodiment, the first valve 222 can be a one-to-many valve and conduit segment 224 in the accommodating space 50 comprises two separate pipelines, wherein one pipeline is coupled to the storage unit 29 for providing hot water steam while the other pipeline is coupled to the food processor 8 for providing hot water.

Figure 15:
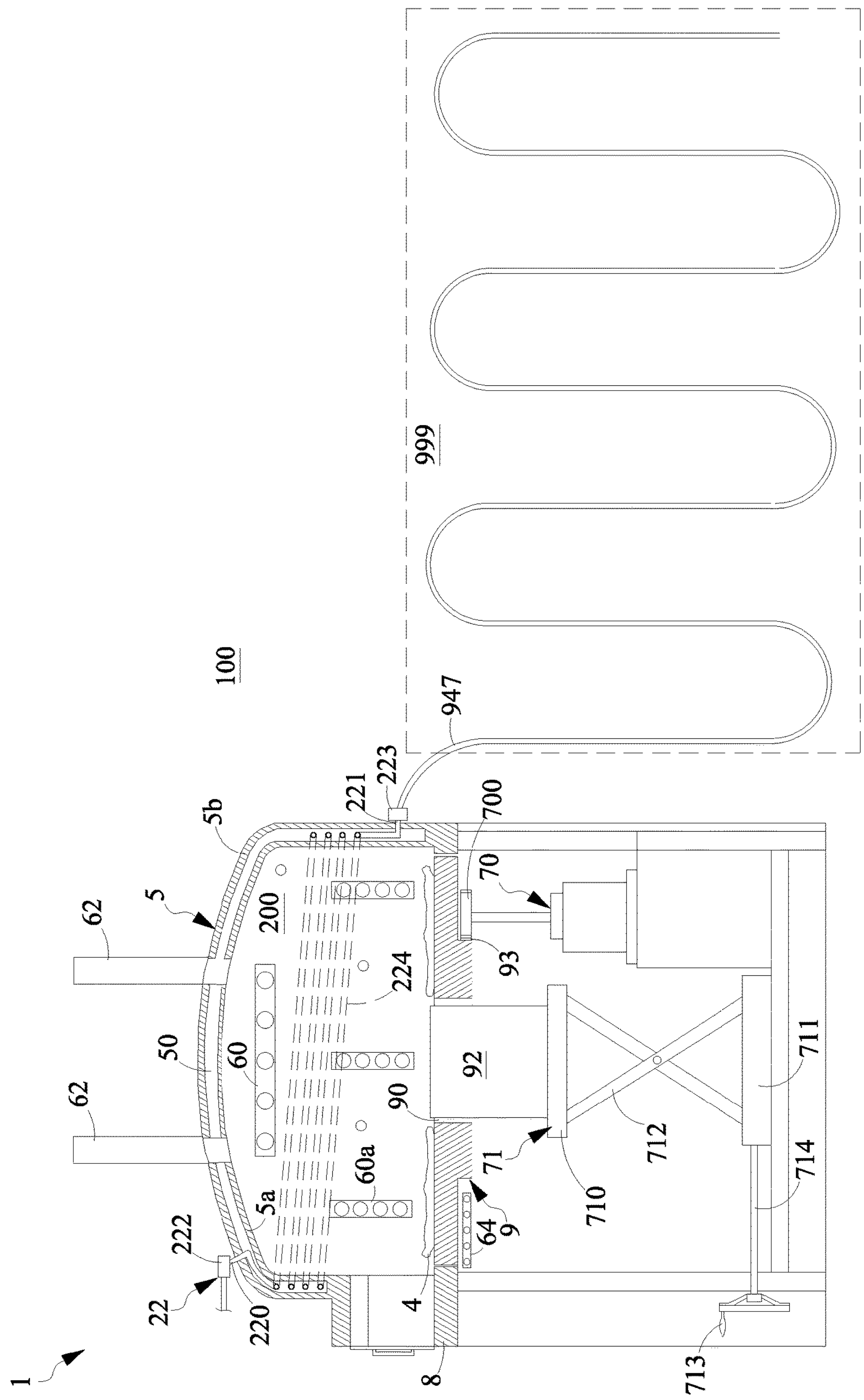
FIG. 15 illustrates another embodiment of conduit assembly that is utilized to form a heat distributor arranged within an interior of a room.

Please refer to FIG. 15, which illustrates another embodiment of conduit assembly that is utilized to make a heat distributor of a room interior. In the present invention, the conduit assembly 22 further comprises an extension pipeline 947. One end of the extension pipeline 947 is coupled to the second valve 223 and the pipeline 947 is arranged to warm a room interior 999. In one embodiment, the pipeline 947 is buried under the floor of the room while, in alternative embodiment, the pipeline 947 can also be arranged at the other side of the wall for warming the room interior. In the embodiment shown in FIG. 15, the hot water flow is circulated in the conduit assembly 22 so that the hot water can flow into the pipeline 947 thereby distributing heat energy to the room interior 999. The heat distributor shown in FIG. 15 can be useful in winter for controlling the temperature of the room interior in warm and comfortable status so that the restaurant or store having the oven apparatus 1 can use the recycled heat thereby saving cost of heat energy consumption.

Figure 16A:
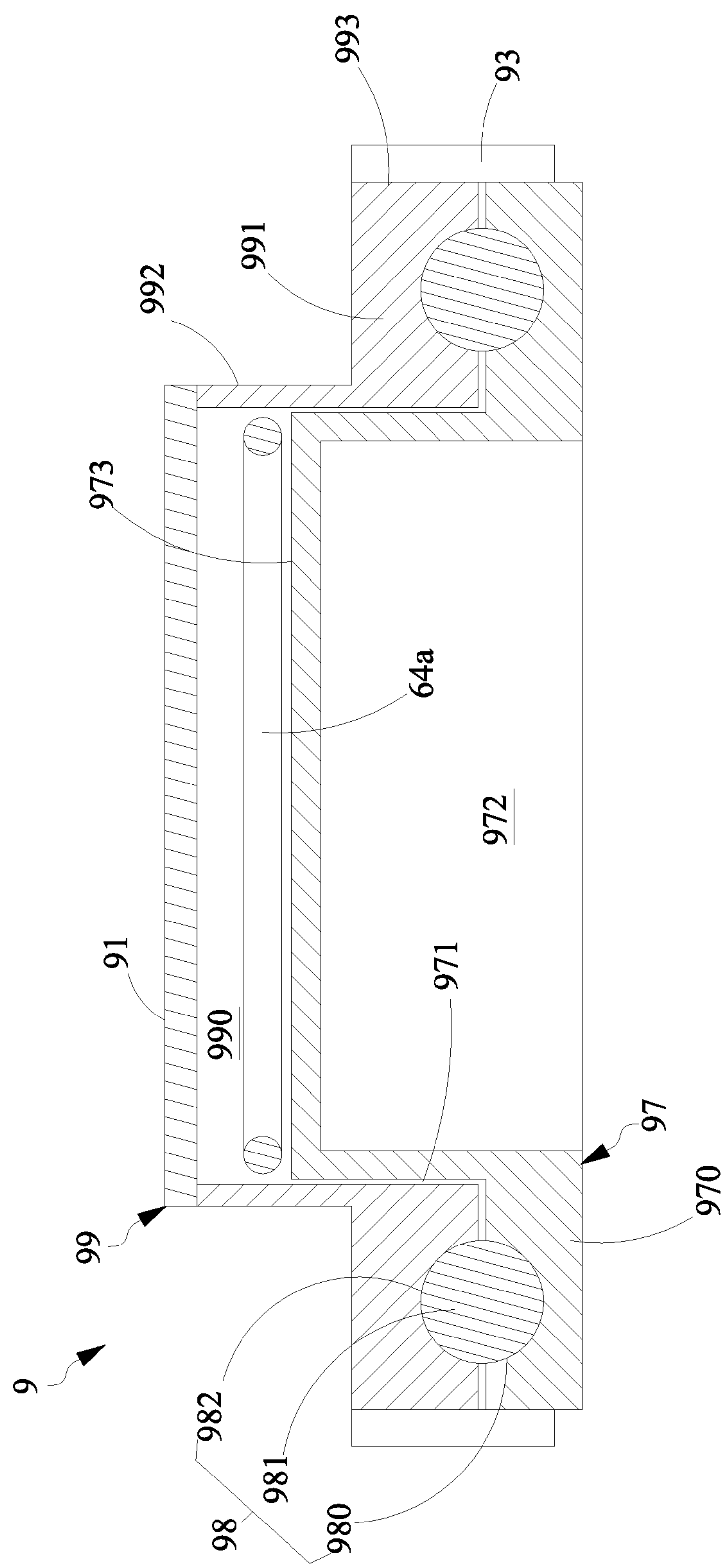
FIGS. 16A to 16D illustrate different embodiments of rotary structure according to the present invention.

Pleas refer to FIG. 16A, which illustrates another embodiment of the rotary structure of the present invention. In the embodiment shown in FIG. 16A, the rotary structure 9 comprises a base structure 97, a guiding structure 98, and a rotary plate 99. The base structure 97 has a first peripheral protrusion 970 around a periphery 971 of the base structure 97, and a space 972 inside the base structure 97. It is noted that the space 972 can be eliminated such that the base structure is a solid base structure. The guiding structure 98 is arranged between the base structure 97 and the rotary plate 99 so that the rotary plate 99 can be driven to rotate smoothly on the base structure 97. In one embodiment, the guiding structure 98 comprises a first groove 980, a plurality of bearing balls 981, and a second groove 982, wherein the first groove 980 is formed on the first peripheral protrusion 970 around the periphery 971, the plurality of bearing balls is arranged on the first groove 980, and the a second groove 982 is formed on the rotary plate 99. It is noted that the guiding structure 98 is not limited to the present embodiment. For example, the guiding structure 98 can also be a guide rail design which is well known by the one having ordinary skilled in the art.

In addition, a second heating device 64*a* is formed on a top surface 973 of the base structure 97. It is noted that the second heating device 64*a* in the present embodiment can be tubular heater or heating coil. In one embodiment, the second heating device 64*a* has at least one circular tubular heater concentrically arranged on the top surface 973 of the base structure 97. It is noted that the shape of the second heating device 64*a* is not limited to circular shape. The shape of the second heating device 64*a* depends on the design and layout arrangement according to user's need. In addition, the second heating device 64*a* is not limited to the electrical heating device, as well. For example, it can also be a gas heater.

The rotary plate 99 is configured to comprise a heating space 990, and a second peripheral protrusion 991 formed around a peripheral surface 992 of the rotary plate 99. In the present embodiment, the second groove 982 is formed on a bottom surface of the peripheral protrusion 991 corresponding to the top surface of the first protrusion 970 having the first groove 980 formed thereon. The rotary plate 99 is covered on the base structure 97 so that the second peripheral protrusion 991 is coupled to the guiding structure 98, and the second heating device 64*a* is accommodated within the heating space 990. In the present embodiment, the second groove 982 formed on the second protrusion 991 is coupled to the bearing balls arranged on the first groove 981 formed on the first protrusion 970. In order to drive the rotary plate 99 to rotate on the base structure 97, a driven structure, e.g., the driven gear 93 in the present embodiment is formed on a peripheral surface 993 of the rotary plate 99.

Figure 16B:
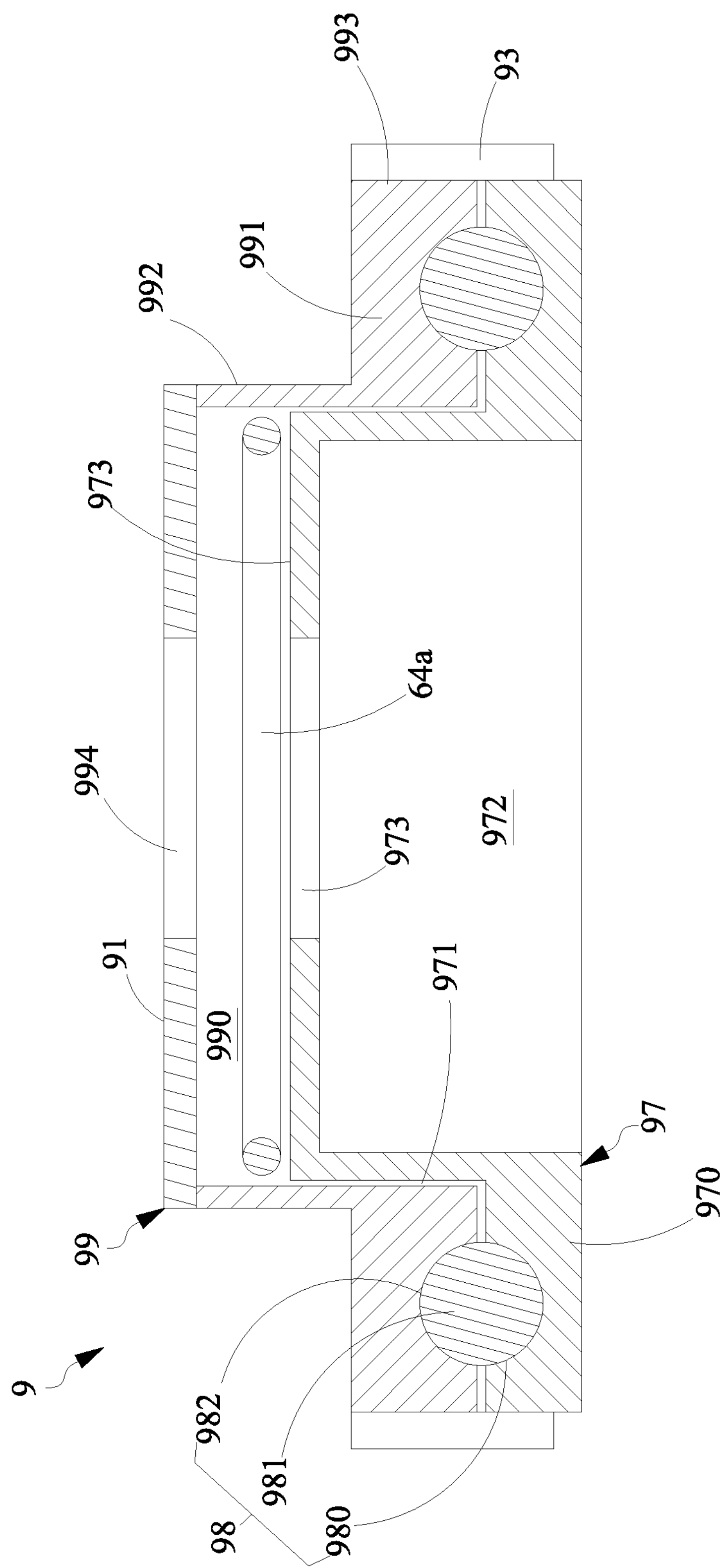

Please refer to FIG. 16B, basically, it is almost the same as the embodiment shown in FIG. 16A, and the different part is that the base structure 97 further comprises a first through hole 973, and the rotary plate 99 comprises a second through hole 994 corresponding to the first through hole 973 such that the elevator 71 shown in the previous embodiments can be utilized to lift or lower the charcoal furnace 92 through the first and second through hole 973 and 994.

Figure 16C:
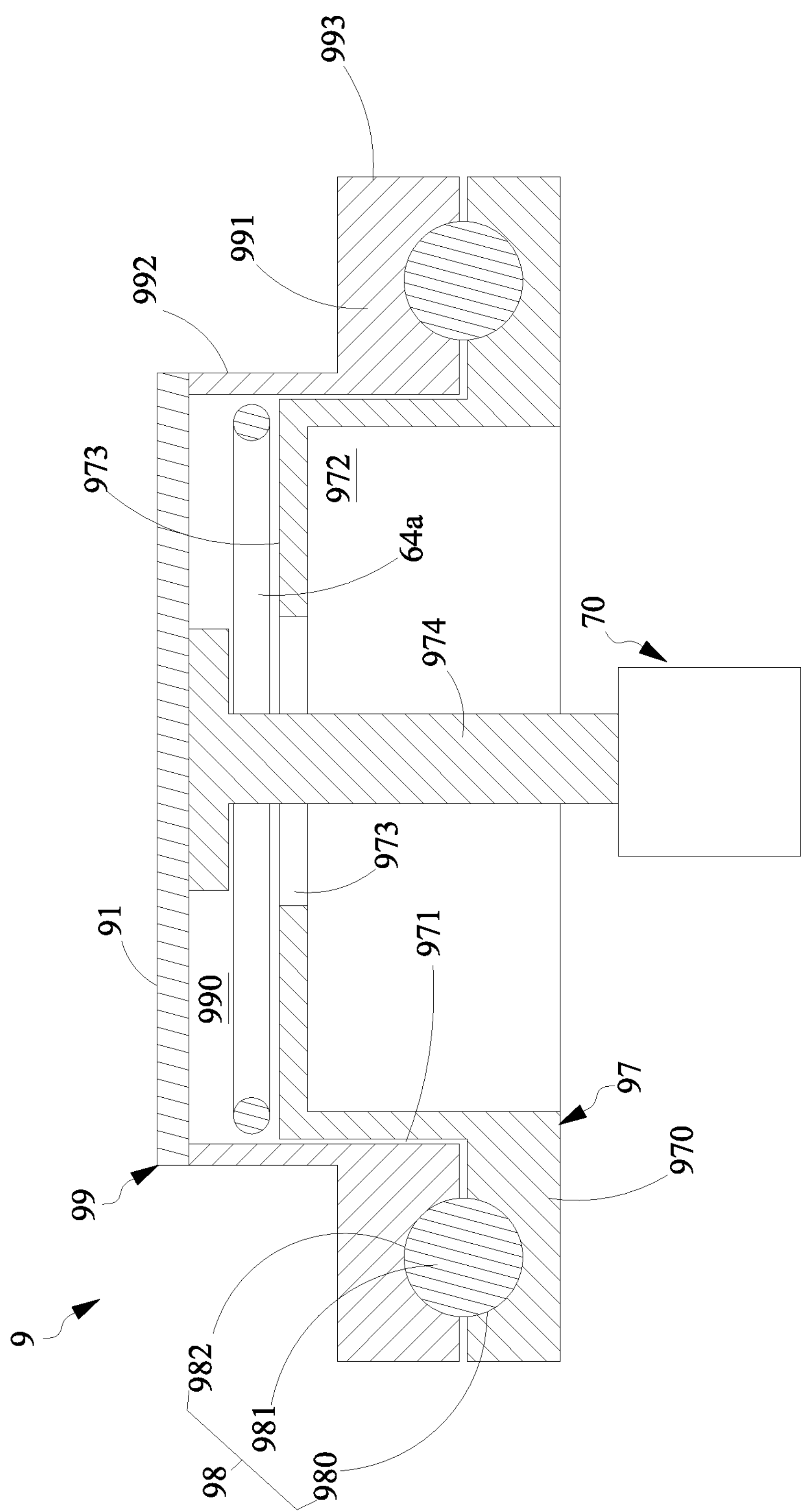
Figure 16D:
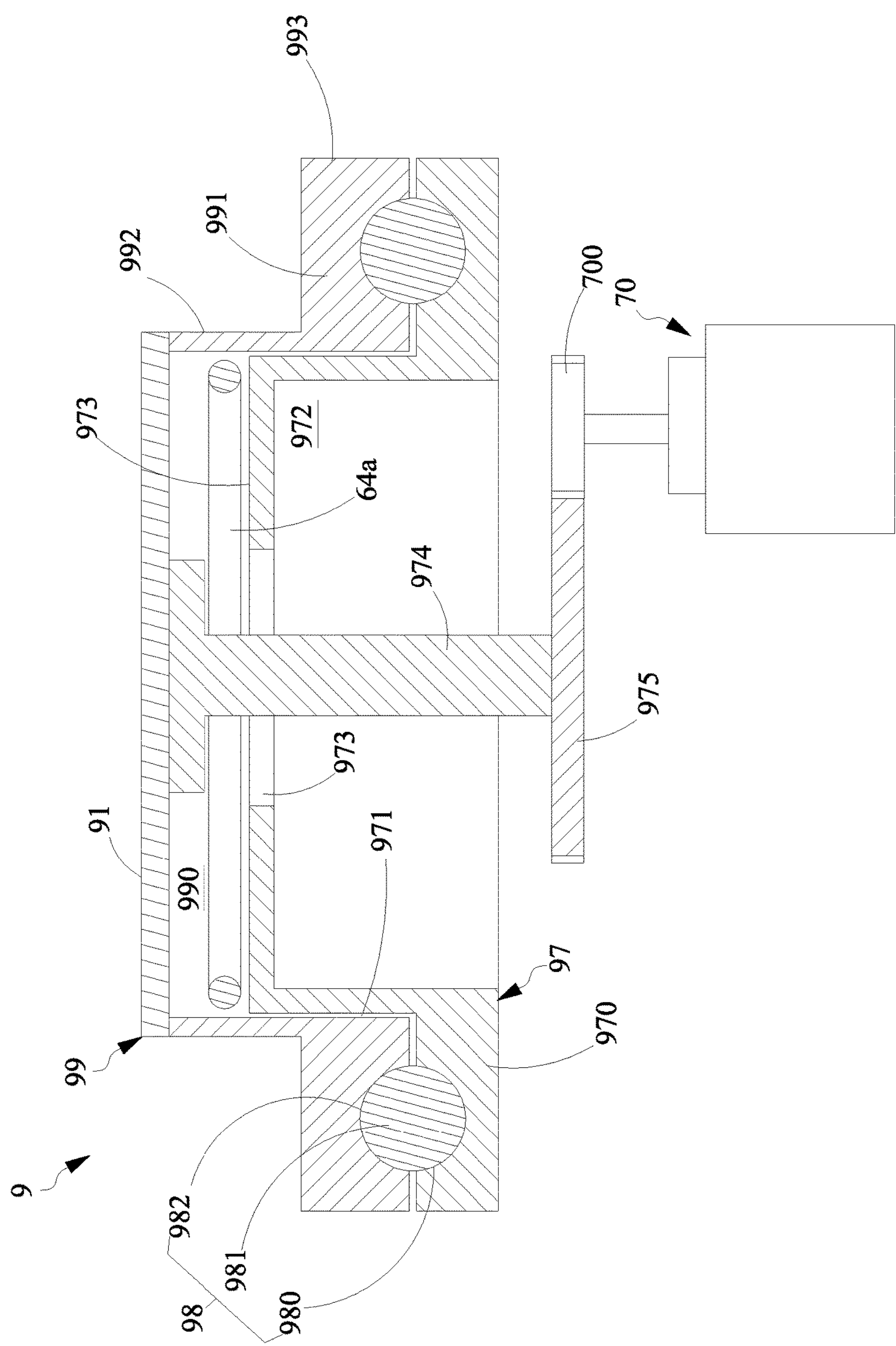

Please refer to FIGS. 16C and 16D, which illustrates the rotary plate according to another embodiment of the present invention. In FIG. 16C, basically, it is almost the same as the embodiment shown in FIG. 16A, wherein the different part is that the base structure 97 further comprises a first through hole 973, and a driven structure, e.g. a rotary shaft 974 in the present embodiment, arranged inside the heating space 990 and coupled to a bottom surface of the rotary plate 99. One end of the rotary shaft 974 passes through the first through hole 973 and is coupled to a driving power source, e.g. rotary motor 70, for example. Alternatively, please refer to FIG. 16D, the end of the rotary shaft 974 can further coupled to a driven gear 975 for receiving a driving force through a driving gear 700 coupled to the rotary motor 70.

It is noted that the rotary structure shown in FIGS. 16A to 16D can be utilized in the above-mentioned embodiments shown in FIGS. 1-15.

While the present invention has been particularly shown and described with reference to a preferred embodiment, it will be understood by those skilled in the art that various changes in form and detail may be without departing from the spirit and scope of the present invention.

What is claimed is:

1. An oven apparatus, comprising:

an oven portion, configured to have an oven housing having an oven opening coupled to an upper chamber of the oven housing, a support platform coupled to the upper chamber, and a first heating device arranged in the upper chamber, wherein a void space is formed in the support platform for accommodating a rotary structure on which an object is arranged; and an oven controller, configured to have a power module electrically coupled to an external power source for providing a required power to the oven portion, and a heating control module electrically coupled to the power module, wherein the heating control module further has a first heat control unit and a second heat control unit electrically coupled to the first heating device and the rotary structure, respectively, for controlling a temperature of the first heating device and a temperature of the rotary structure according to predetermined temperatures respectively corresponding to the first heating device and rotary structure, wherein the upper chamber further comprises a ventilation opening communicated with an exterior environment through a ventilation conduit, and a suction motor coupled to the ventilation opening, wherein a pipe wall of the ventilation conduit further comprises a gas valve utilized to controlled timing and rate of smoke emission.

2. The oven apparatus of claim 1, further comprising an operation opening coupled to a lower chamber of the oven housing, and a charcoal furnace, wherein the rotary structure has circular shape and is made of cast iron, and a center of the rotary structure has a through hole communicating with the upper and lower chamber, wherein the charcoal furnace is allowed to be elevated from the through hole and isolates the upper chamber from lower chamber.

3. The oven apparatus of claim 2, further comprising a rotary motor and an elevator arranged in the lower chamber, wherein an end of the rotary motor has a gear coupled to a driven gear portion arranged on the rotary structure so that the rotary structure can be driven to rotate along a central axis of the through hole, and the elevator utilized to control a vertical position of the charcoal furnace further comprises a position confining element, an upper frame for supporting the charcoal furnace, an lower frame for supporting the upper frame, a foldable rod assembly coupled to the upper and lower frames for extending and folding along the vertical direction, and a control wheel for controlling extending and folding operation of the foldable rod assembly through a rotation of the control wheel.

4. The oven apparatus of claim 3, wherein the elevator further comprises an extension rod arranged between the foldable rod assembly and control wheel for increasing an operation distance of the control wheel such that the control wheel is located outside the oven portion.

5. The oven apparatus of claim 3, wherein the oven controller further comprises a motor module electrically coupled to the power module and the rotary motor for providing required electrical power of the motor rotary, and the motor module is utilized to control the rotary motor for adjusting a rotation speed of the rotary structure.

6. The oven apparatus of claim 5, where the oven controller further comprises a sensing module electrically coupled to the heating control module for monitoring instant temperature of the first heating device and rotary structure, and when the monitored instant temperature is over the predetermined temperature, an alarm message is generated.

7. The oven apparatus of claim 6, wherein the oven controller further comprises a plurality of operation interfaces including a first interface, a second interface, and a third interface, wherein the first interface is electrically coupled to the power module, the motor module and the heating control module and further comprises a power switch, a motor switch, an alarm lamp of heating device, an alarm lamp of rotary structure, an alarm lamp switch of the heating device, and an alarm lamp switch of rotary structure, the second interface is electrically coupled to the motor module and further comprises an adjusting knob for adjusting motor speed, and the third interface is electrically coupled to the first heating device and further comprises a display for displaying the instant temperature and predetermined temperature of the first heating device and rotary structure.

8. The oven apparatus of claim 1, wherein the oven housing has a hollow space therein for forming a heat convection space communicating with the ventilation conduit whereby the excess heat collected from the oven housing is exhausted to the exterior environment through the ventilation conduit so as to prevent accumulation of excess heat from affecting heating control.

9. The oven apparatus of claim 1, wherein the oven opening further comprises a main opening and two auxiliary openings respectively arranged at the two lateral sides of the main opening for increasing the width of the oven opening, the cover further comprises a main lid for covering the main opening and two lateral lids for covering the two auxiliary openings respectively, and a height of the charcoal furnace is smaller than a height of the oven opening so that the charcoal furnace is allowed to be arranged in the upper chamber through the oven opening.

10. The oven apparatus of claim 1, further comprising a conduit assembly arranged around a top surface of the oven housing for guiding a fluid, and a storage unit communicated with the conduit assembly through pipeline, wherein the storage unit further comprises a pump for providing a driving force to drive water inside the storage unit to circulate in the conduit assembly.

11. The oven apparatus of claim 10, wherein the storage unit further comprises:

a water tank;

a first valve, coupled to an inlet part of the conduit assembly and the water tank;

a second valve, coupled to an outlet part of the conduit assembly and the water tank; and a temperature sensor, configured to detect a temperature of the water inside the water tank.

12. The oven apparatus of claim 10, further comprising a storage unit communicating with an outlet of the conduit assembly through pipeline, wherein the storage unit further comprises:

a water tank;

a first valve, coupled to an inlet part of the conduit assembly;

a second valve, coupled to the outlet and the water tank;

a temperature sensor, configured to detect a temperature of the water inside the water tank; and a control unit, configured to control ON/OFF of the first and second valves according to temperature detected by the temperature sensor.

13. The oven apparatus of claim 10, wherein the oven housing further comprises a first shell structure and a second shell structure fixedly connected to the first shell structure or detachably connected to the first shell structure, an accommodating space is formed between the first and second shell structures, and the conduit assembly further comprises an inlet part, a conduit segment, and an outlet part, wherein the inlet part and the outlet part are respectively coupled to the second shell structure, and the conduit segment is arranged in the accommodating space.

14. The oven apparatus of claim 13, wherein the conduit segment is spirally arranged around the top of the first shell structure inside the accommodating space.

15. The oven apparatus of claim 10, wherein the conduit assembly is extended outside the oven apparatus and the extended part of the conduit assembly is arranged under a floor or behind a wall of an interior space.

16. The oven apparatus of claim 1, wherein the rotary structure further comprising:

a base structure, configured to have a first peripheral protrusion around a periphery of the base structure;

a guiding structure, formed on the first peripheral protrusion;

a second heating device, formed on a top surface of the base structure;

a rotary plate, configured to have a heating space, and a second peripheral protrusion, wherein the rotary plate is covered on the base structure so that the second peripheral protrusion is coupled to the guiding structure, and the second heating device is accommodated within the heating space; and a driven structure, coupled to the rotary plate for receiving a driving power from a driving power source.

17. The oven apparatus of claim 16, wherein the base structure further comprises a first through hole, and the rotary plate comprises a second through hole corresponding to the first through hole.

18. The oven apparatus of claim 16, wherein the driven structure is a driven gear coupled to a peripheral surface of the second peripheral protrusion.

19. The oven apparatus of claim 16, wherein the base structure further comprises a first through hole, the driven structure is a rotary shaft coupled to a bottom surface inside the heating space of the rotary plate, and the rotary shaft passes through the first through hole and is coupled to the driving power source.

* * * * *